(12) United States Patent
An et al.

(10) Patent No.: US 9,380,402 B2
(45) Date of Patent: Jun. 28, 2016

(54) APPARATUS AND METHOD FOR CONTROLLING A BACKBONE NETWORK FOR A SENSOR NETWORK

(75) Inventors: Sun-shin An, Seoul (KR); Doo-hyun Ko, Seoul (KR); Bumjin Kim, Seoul (KR)

(73) Assignee: Korea University Research and Business Machines, Seoul (KR)

( * ) Notice: Subject to any disclaimer, the term of this patent is extended or adjusted under 35 U.S.C. 154(b) by 219 days.

(21) Appl. No.: 14/112,838

(22) PCT Filed: Apr. 17, 2012

(86) PCT No.: PCT/KR2012/002914
§ 371 (c)(1),
(2), (4) Date: Oct. 18, 2013

(87) PCT Pub. No.: WO2012/148115
PCT Pub. Date: Nov. 1, 2012

(65) Prior Publication Data
US 2014/0036728 A1   Feb. 6, 2014

(30) Foreign Application Priority Data

Apr. 25, 2011   (KR) .................. 10-2011-0038457
Aug. 31, 2011   (KR) .................. 10-2011-0087961

(51) Int. Cl.
*H04W 4/00*   (2009.01)
*H04W 40/02*  (2009.01)
(Continued)

(52) U.S. Cl.
CPC  *H04W 4/00* (2013.01); *H04W 4/06* (2013.01); *H04W 4/24* (2013.01); *H04W 40/02* (2013.01); *H04W 88/18* (2013.01); *H04L 45/42* (2013.01)

(58) Field of Classification Search
CPC .............................. H04W 4/00; H04W 4/06
USPC ................... 370/254, 259, 311, 392
See application file for complete search history.

(56) References Cited

U.S. PATENT DOCUMENTS 8,150,015 B1 *  4/2012  Whitney ............... H04M 3/563
                                                    379/201.12
8,582,777 B2 * 11/2013  Urivskiy ............. H04L 9/0822
                                                    380/277

(Continued)

FOREIGN PATENT DOCUMENTS

KR   10-2007-0057597 A    6/2007
KR   10-2008-0107889 A   12/2008

(Continued)

OTHER PUBLICATIONS

International Search Report for Application No. PCT/KR2012/002914 dated Nov. 1, 2012.

*Primary Examiner* — Parth Patel
(74) *Attorney, Agent, or Firm* — Alston & Bird LLP

(57) ABSTRACT

The apparatus for controlling a backbone network according to the present invention comprises: a context-interpreting unit, which interprets the request for a service of a sensor node, and generates a session containing routing information; a sensor node registration unit, which stores sensor node information and routing information, and which provides routing information; a gateway, which transmits the service request using routing information, and which receives a response message; and a message-processing unit, which transmits the service request, and which provides the response message.

20 Claims, 12 Drawing Sheets

(51) Int. Cl.
 *H04W 88/18* (2009.01)
 *H04W 4/06* (2009.01)
 *H04W 4/24* (2009.01)
 *H04L 12/717* (2013.01)

(56) References Cited

U.S. PATENT DOCUMENTS

| | | | | |
|---|---|---|---|---|
| 2002/0176377 A1* | 11/2002 | Hamilton | H04L 12/24 | 370/328 |
| 2004/0018839 A1* | 1/2004 | Andric | H04L 12/2856 | 455/433 |
| 2004/0157557 A1* | 8/2004 | Barnett | H04W 36/30 | 455/41.2 |
| 2005/0091370 A1* | 4/2005 | Wietfeld | H04L 29/06 | 709/224 |
| 2005/0152305 A1* | 7/2005 | Ji | H04L 45/54 | 370/328 |
| 2006/0015590 A1* | 1/2006 | Patil | H04L 63/08 | 709/220 |
| 2006/0155802 A1* | 7/2006 | He | H04L 29/06 | 709/203 |
| 2006/0220843 A1* | 10/2006 | Broad | G08B 25/009 | 340/539.23 |
| 2006/0251043 A1* | 11/2006 | Madour | H04L 47/2425 | 370/349 |
| 2007/0071012 A1* | 3/2007 | Park | H04L 12/2803 | 370/395.53 |
| 2007/0268898 A1* | 11/2007 | Ratiu | H04L 45/00 | 370/389 |
| 2008/0084294 A1* | 4/2008 | Zhiying | G08B 21/12 | 340/539.22 |
| 2008/0232338 A1* | 9/2008 | Ji | H04L 45/54 | 370/338 |
| 2009/0113057 A1* | 4/2009 | Van der Merwe | H04L 29/12349 | 709/227 |
| 2009/0172195 A1* | 7/2009 | Risbud | H04L 29/12264 | 709/245 |
| 2009/0322510 A1* | 12/2009 | Berger | H04W 60/00 | 340/539.1 |
| 2010/0150122 A1* | 6/2010 | Berger | H04W 4/02 | 370/338 |
| 2010/0157963 A1* | 6/2010 | Choi | H04L 12/4633 | 370/338 |
| 2010/0172298 A1* | 7/2010 | Shin | H04W 8/02 | 370/328 |
| 2010/0245054 A1* | 9/2010 | Kim | G06K 7/10336 | 340/10.4 |
| 2010/0329260 A1* | 12/2010 | Kim | H04L 45/00 | 370/392 |
| 2011/0051645 A1* | 3/2011 | Hong | H04L 45/48 | 370/311 |
| 2011/0090787 A1* | 4/2011 | Smith | H04L 41/0659 | 370/225 |
| 2011/0216709 A1* | 9/2011 | Noldus | H04W 76/002 | 370/328 |
| 2012/0019365 A1* | 1/2012 | Tuikka | G06Q 30/02 | 340/10.1 |
| 2012/0176936 A1* | 7/2012 | Wu | H04W 8/26 | 370/254 |
| 2012/0190386 A1* | 7/2012 | Anderson | G01C 15/04 | 455/456.3 |
| 2013/0223447 A1* | 8/2013 | Kahng | H04L 61/609 | 370/392 |
| 2014/0247140 A1* | 9/2014 | Proud | H04W 4/206 | 340/870.02 |

FOREIGN PATENT DOCUMENTS

| | | | | |
|---|---|---|---|---|
| KR | 10-2009-0011583 A | | 2/2009 | |
| WO | WO 2011037197 | * | 3/2011 | H04W 8/06 |

* cited by examiner

APPARATUS AND METHOD FOR CONTROLLING A BACKBONE NETWORK FOR A SENSOR NETWORK

CROSS-REFERENCE TO RELATED APPLICATIONS

This application is a national stage application filed under 35 U.S.C. 371 of International Application No. PCT/KR2012/002914, filed Apr. 17, 2012, which claims priority to Korean Patent Application No. 10-2011-0038457, filed on Apr. 25, 2011, and Korean Patent Application No. 10-2011-0087961, filed on Aug. 31, 2011, each of which is incorporated herein in its entirety.

TECHNICAL FIELD

The present invention relates to an apparatus for controlling a backbone network for a sensor network, and more particularly to an infrastructure for a sensor network supporting broad mobility and a control apparatus for configuring the infrastructure.

BACKGROUND ART

Along with the recent rapid development of wireless communication, smart sensor nodes have been realized that require low power consumption, can be manufactured at low cost, and are small in size. These sensor nodes are used to measure a variety of ambient environment factors. With a plurality of sensor nodes, a Wireless Sensor Network (WSN) having a self-organizing ability can be built without human support. Accordingly, even though a plurality of sensor nodes are dropped randomly from an aircraft or a helicopter and are then deployed, they can form a WSN with their wireless communication means.

Each sensor node of the WSN acquires sensing information through its sensor and transmits the sensing information to a core network through a sink node or a gateway. Therefore, the sensor nodes may find their applications in various fields such as disaster prevention systems and location-based services. The core network includes an infrastructure and a network that are specialized for a sensor network service as well as a backbone network or the Internet.

In general, a sensor node is identified by a pre-input fixed Identifier (ID) or an ID allocated by a Personal Area Network (PAN) coordinator. This simple, static identification method makes it difficult to distinguish services requested by respective user terminals and sensing information received from a large number of sensor nodes on the part of a core network having interfaces between user terminals or application servers and various sensor nodes. Moreover, if the number of sensor nodes increases rapidly, it is likely to provide wrong information in view of the same IDs. Considering diversification of sensor node terminal providers, service access authority may be limited. Thus, problems may arise in providing a service suitable for authority.

In terms of management and service control of sensor nodes and a sensor network formed with the sensor nodes, conventional sensor network technologies disclosed in the following non-patent documents simply provide environment monitoring through data sensing in a local environment. That is, the general sensor network control technologies do not have a configuration that provides services including mobility support of sensor nodes, registration and deregistration between various types of sensor nodes and a gateway, handover, mobility history management, tracking, etc. As a consequence, a general sensor network does not provide a location-based service and mobility support using indoor and outdoor location information. Further, the software framework of the sensor network does not have a real-time integrated framework including the sensor network.

Therefore, there exists a need for a method for controlling a backbone network in order to efficiently manage sensor nodes and provide an accurate, flexible sensor network service.

Disclosure

Technical Problem

An object of the present invention is to overcome a limitation that identification, registration, and function control between sensor nodes and a gateway are not managed in an integrated manner from the perspective of a backbone network in view of the focus of a sensor network control technology on network configuration in a local environment and thus to solve the problem of the resulting restriction of broad mobility of the sensor nodes to a local range.

Another object of the present invention is to provide a method for controlling a sensor network in order to protect a backbone network from the access of an unauthenticated sensor node.

Technical Solution

In accordance with an aspect of the present invention, an apparatus for controlling a backbone network for a sensor network includes a context interpreter for interpreting a service request requesting a service to a sensor node, received from a user according to the type of the service request and generating a session including routing information about the interpreted service request, a sensor node register for storing sensor node information and routing information about sensor nodes registered to the backbone network and, upon receipt of the service request, providing routing information corresponding to the service request to the context interpreter, a gateway for transmitting the service request to the sensor node registered to the backbone network and receiving a response message to the service request from the registered sensor node, and a message processor for transmitting the service request received from the context interpreter to the gateway through the generated session and providing the response message received from the gateway to the user.

The apparatus may further include a user authenticator for storing registration information and authorization information about the user and, upon receipt of the service request from the user, transmitting an authentication result of the user to the context interpreter.

The apparatus may further include an alias interpreter for mapping each of aliases indicating service-requested objects to information about one or more gateways corresponding to the alias and storing the mapped aliases and gateway information. If the service request includes an alias, the context interpreter may receive gateway information corresponding to the alias from the alias interpreter by querying the alias interpreter about the alias.

The apparatus may further include a sensor node authenticator for pre-storing information about sensor nodes that are accessible to the backbone network. If the sensor node accesses the backbone network for registration, the sensor node register may determine whether to allow the sensor node to access the backbone network by asking the sensor node authenticator whether the sensor node is authorized to access the backbone network.

The apparatus may further include a backbone network configurer for managing a network setting to maintain a connection between components included in the backbone network.

In accordance with another aspect of the present invention, a method for controlling a backbone network for a sensor network includes receiving an authentication request for the backbone network, including a unique Identifier (ID) of a sensor node without a backbone ID, from a gateway, storing association information between the sensor node and the gateway, determining whether the unique ID of the sensor node exists in a preset sensor node authenticator by querying the sensor node authenticator about the unique ID of the sensor node, allocating the backbone network ID to the sensor node in the presence of the unique ID of the sensor node in the sensor node authenticator, registering the sensor node by mapping the backbone network ID to the association information between the sensor node and the gateway and storing the mapped backbone network ID and association information, and transmitting an authentication accept message and the backbone network ID to the gateway.

A computer-readable recording medium stores a program for performing the method for controlling each component in the apparatus for controlling a backbone network for a sensor network, which is executed by a computer.

Advantageous Effects

According to the embodiments of the present invention, a backbone network for a sensor network can manage identification and registration between sensor nodes and a gateway in an integrated manner. Therefore, even in a situation where a plurality of sensor nodes belong to heterogeneous sensor networks or sensor nodes move across a broad area, the broad mobility of the sensor nodes can be controlled/managed without limitations in the backbone network. In addition, the backbone network can be protected from the access of a sensor node unauthenticated in a sensor node authentication procedure.

BEST MODE

Figure 1:
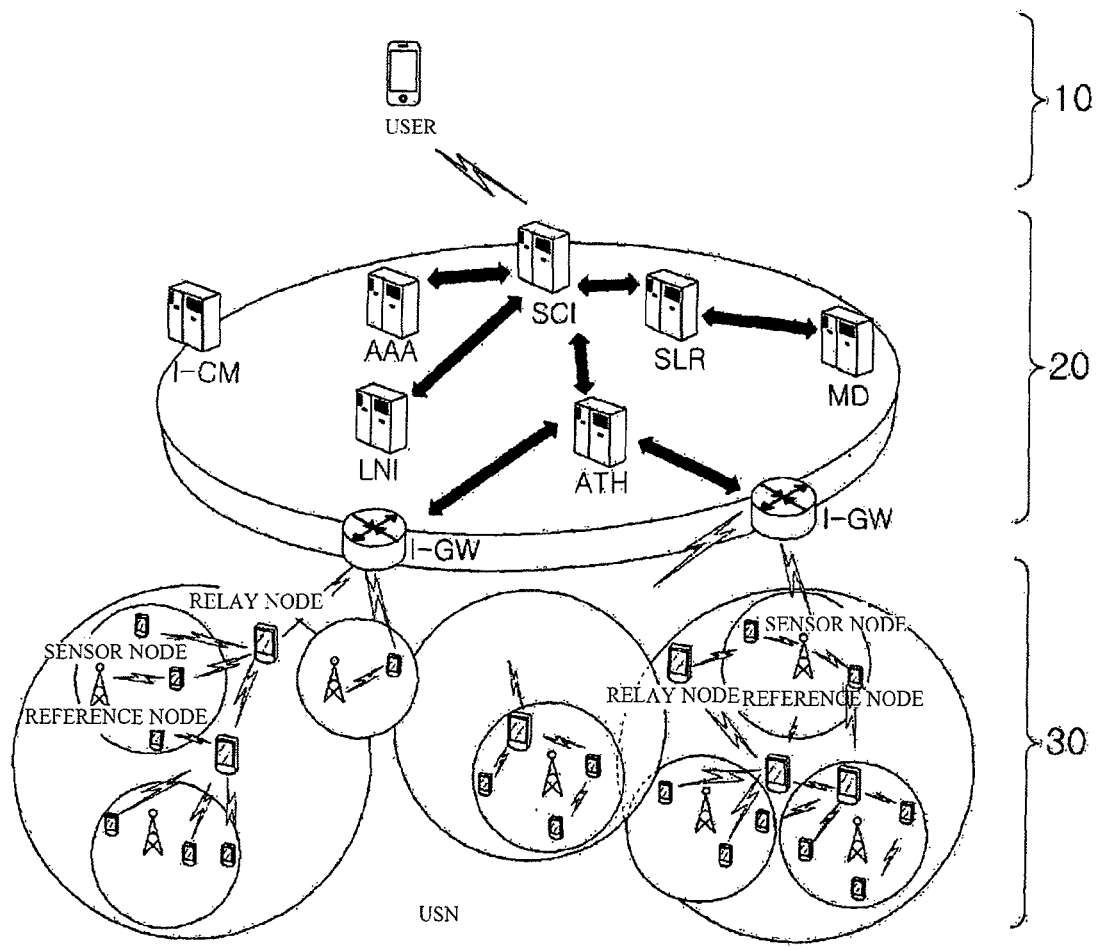
FIG. 1 illustrates an infrastructure for controlling a backbone network for a sensor network according to an embodiment of the present invention in an environment in which embodiments of the present invention are implemented.

In accordance with an embodiment of the present invention, an apparatus for controlling a backbone network for a sensor network includes a context interpreter for interpreting a service request requesting a service to a sensor node, received from a user according to the type of the service request and generating a session including routing information about the interpreted service request, a sensor node register for storing sensor node information and routing information about sensor nodes registered to the backbone network and, upon receipt of the service request, providing routing information corresponding to the service request to the context interpreter, a gateway for transmitting the service request to the sensor node registered to the backbone network and receiving a response message to the service request from the registered sensor node, and a message processor for transmitting the service request received from the context interpreter to the gateway through the generated session and providing the response message received from the gateway to the user.

MODE FOR INVENTION

Reference will be made to preferred embodiments of the present invention.

Before describing embodiments of the present invention, the basic idea of the present invention that can be derived from the characteristics of a sensor network environment in which the embodiments of the present invention are implemented will first be described below.

As introduced previously, the conventional sensor network does not provide an infrastructure for a sensor network that interworks with a user application while supporting broad mobility of sensor nodes. Accordingly, an infrastructure of sensor network proposed in embodiments of the present invention should be able to provide registration and deregistration between various sensor nodes and a gateway, handover, movement history management, tracking, security, and communication protocols between a mobility supporting infrastructure and the gateway and between the gateway and the sensor network, for supporting mobility of sensor nodes. In addition, an elaborate location supporting code for a Location-Based Service (LSB) and an infrastructure for supporting the LSB are required.

Therefore, at the moment mobility of sensor nodes is increased, the present invention is intended to provide an integrated infrastructure for developing a gateway that enables connections of various types of sensor nodes, relays, and a sensor network and providing an integrated infrastructure for locating sensor nodes, supporting node mobility, and providing a user service by facilitating development, implementation, and management of an infrastructure for the sensor network.

For this purpose, the embodiments of the present invention as set forth herein define components and an infrastructure of a backbone network control system for a sensor network. Particularly, the backbone network control system adopts an integrated infrastructure to guarantee broad mobility of the sensor network, inclusive of an LSB technology of a backbone network, a technology of supporting broad mobility of sensor nodes, a sensing information storage and management technology, and a sensing information collection and transmission technology.

With reference to the attached drawings, various embodiments of the present invention will be described in more detail. Like reference numerals denote the same components throughout the drawings and to describe a component in one drawing, another component shown in another drawing can be cited, when needed.

FIG. 1 illustrates an infrastructure for controlling a backbone network for a sensor network according to an embodiment of the present invention in an environment in which embodiments of the present invention are implemented. A whole integrated system includes a user 10, an infrastructure backbone network 20, and an individual sensor network 30.

The user 10 may transmit a service request to a sensor node in the sensor network 30 through the infrastructure backbone network 20 and may receive a processing result of the service request or a sensing result as a response from the sensor node. The premise and specific functions for achieving the foregoing objects are described below.

The user 10 has a protocol or an interface by which the user can communicate with the backbone network 20. The user 10 may generate and transmit a service request to a sensor node by the protocol or via the interface. Service requests may be classified into various types. For example, the user 10 may transmit at least one service request selected from an on-demand request, a period request, and an event-driven request. Those skilled in the art will appreciate that besides the above types of service requests, many other types of service requests can be used.

To effectively support broad mobility of a sensor network, the sensor network may be named by an alias. The alias indicates a region or a group. At least one sensor network or sensor node may be named by one alias. A user may request a service using an alias-named sensor node set (e.g. 'sensor group #17') or a specific alias name (e.g. 'Korea University' or 'Anam-dong').

Further, when requesting a service, the user may request storage of a service result history or may check billing information about the service request.

The sensor network 30 is a set of sensor nodes each having a unique Identifier (ID). While the sensor network 30 is shown as a Ubiquitous Sensor Network (USN) in FIG. 1 by way of example, various networks based on wired/wireless sensors as well as the USN standard may be utilized to configure and deploy the sensor network 30 in an embodiment of the present invention.

Sensor nodes of the sensor network 30 form a group of networks according to a unique network configuration rule and have an appropriate protocol and appropriate communication interfaces to communicate with a communication means (a device called "I-GW" in FIG. 1) of the infrastructure backbone network 20. For example, if the sensor network 30 conforms to the USN standard, the communication means of the backbone network 20 may be a device acting as a PAN coordinator and both may communicate with each other by a communication protocol defined in the USN standard. A sensor node may be allocated to a backbone network ID generated by the backbone network 20 and may be registered to the backbone network 20 using the backbone network ID, by the protocol.

Before the sensor node performs the request of the infrastructure backbone network 20 (more exactly, the service request of the user 10), the sensor node should perform initial subscription through an I-GW of the backbone network 20. The subscription is a process of registering the sensor node initially to the backbone network before the backbone network recognizes the sensor node of the sensor network. General information (e.g. a service type or a service capability) about the sensor node is registered to the infrastructure backbone network 20 and the sensor node receives the backbone network ID of the backbone network 20 and information about the backbone network 20 and the I-GW, during the initial subscription.

To get its broad mobility ensured, the sensor node should perform a registration procedure with the backbone network 20 each time the I-GW is changed during movement (i.e. movement between individual independent sensor networks 30). For this purpose, sensing information of the sensor node may include a physical location value determined in various location detection methods. As can be seen from FIG. 1, in this embodiment of the present invention, a plurality of communication means (I-GWs) are connected to the backbone network 20. An exclusive sensor network may be configured to include one or more sensor nodes through the sensor network and an I-GW. Assuming that a sensor node belonging to one sensor network moves to another sensor network in the afore-described structure, only routing information (i.e. I-GW information changed due to movement of the sensor node) instead of the whole general information about the sensor node is registered and updated in the backbone network 20 during a registration procedure because the sensor node has already completed initial subscription.

The functions of components of the infrastructure backbone network 20 and interfaces between the components will be described. The backbone network 20 connects the user 10 to the sensor network 20 by means of the components and provides various functions to support broad mobility of sensor nodes. A detailed description will now be given of components included in the backbone network 20 and the functions of the components with reference to FIG. 2.

Figure 2:
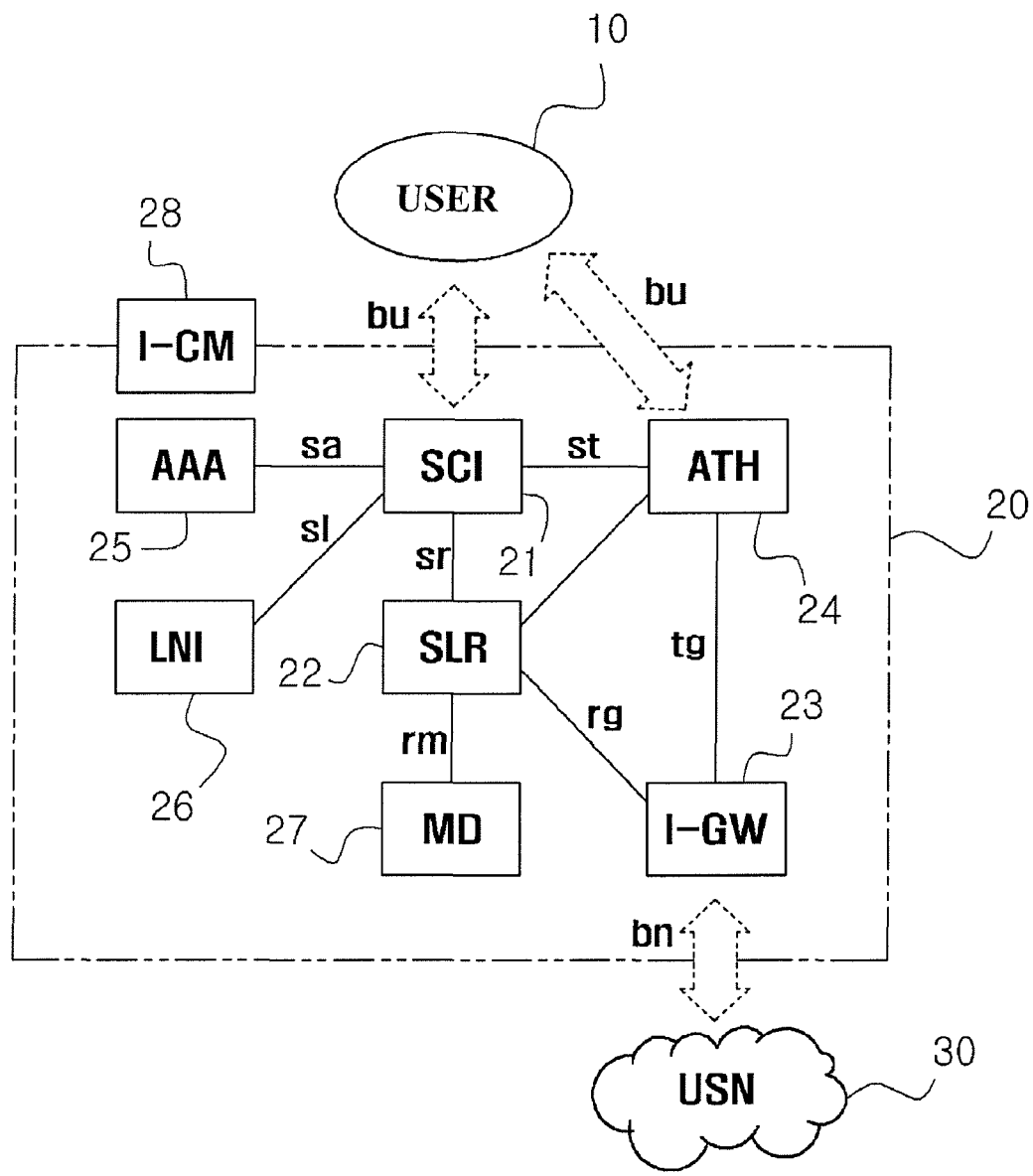
FIG. 2 is a block diagram of an apparatus for controlling a backbone network for a sensor network according to an embodiment of the present invention.

FIG. 2 is a block diagram of an apparatus for controlling the backbone network 20 for a sensor network according to the embodiment of the present invention. For the convenience of description, individual components of the backbone network 20 described below are given as follows along with their abbreviations. Bracketed numbers are reference numerals denoting the components throughout FIGS. 2 to 6.

Context interpreter (or Smart Context Interpreter (SCI))/21
Sensor node register (or Sensor node Location Register (SLR))/22
Gateway (or Infra-architecture GateWay (I-GW)/23
Message processor (or Aggregation Transmission Handler (ATH))/24
User authenticator (or Authentication Authorization Accounting (AAA))/25
Alias interpreter (or Location Name Interpreter (LNI))/26
Sensor node authenticator (or Master Directory (MD))/27

Backbone network configurer (or Infrastructure Configuration Management (I-CM))/28

In FIG. 2, English lower cases added to links between components denote communication interfaces for communication between the components.

The SCI 21 interprets a service request requesting a service to a sensor node, received from the user 10, according to the type of the service request and generates a session including routing information about the interpreted service request. For this purpose, the SCI 21 receives the service request for the sensor node from the user 10 through a bu interface and replies to the user 10 with a processing result of the service request. Upon generation of the service request from the user 10, the SCI 21 may authenticate the user 10 through the AAA 25 via an sa interface to determine whether the user 10 is authorized to access the sensor node. If the user 10 is authorized to access the sensor node, the SCI 21 may acquire routing information about the sensor node from the SLR 22 via an sr interface or from the LNI 26 via an sl interface according to the type of the service request.

In regard to the authenticated user request, the SCI 21 generates only one session including the routing information about the sensor node in relation to the user request in the infrastructure backbone network 20. The session information includes information about the addresses of the user 10, the ATH 24, and each component for connecting to the sensor network 30. The session information further includes service request information. The SCI 21 transmits the session information to the ATH 24 via an st interface while preserving the session information.

Meanwhile, upon termination of the service, the SCI 21 should be able to notify the user 10 of a billing result related to the service request through the AAA 25. The process of notifying the user 10 of a billing result will be more specifically described later in relation to the AAA 25.

The SLR 22 stores information about sensor nodes registered to the backbone network 20 and routing information about the registered sensor nodes. Upon receipt of the service request from the user 10, the SLR 22 provides the routing information corresponding to the service request to the SCI 21. In embodiments of the present invention, the SLR 22 should store/manage general information about sensor nodes (e.g. information about the service types of the sensor nodes and the sensor types of the sensor nodes). Upon receipt of a request for the routing information about the sensor node from the SCI 21, the SLR 22 should be able to provide information about the I-GW to the SCI 21 in response to the request. Accordingly, the SLR 22 may store, manage, and amend routing information about sensor nodes.

In addition, when the SLR 22 initially subscribes to the sensor node, the SLR 22 stores information about the service type and service capability of the sensor node to be subscribed to. Subsequently, the SLR 22 stores a backbone network ID allocated to the sensor node by mapping the backbone network ID to the I-GW 23 connected to the sensor node so that the SLR 22 can provide the routing information corresponding to the service request to the SCI 21. That is, upon receipt of an initial subscription request for the sensor node from the I-GW 23, the SLR 22 authenticates access of the sensor node to the backbone network 20 by interworking with the MD 27 and notifies the I-GW 23 of an authentication result via an rg interface.

If the sensor node which was initially subscribed to requests registration, the SLR 22 may register or update the routing information about the sensor node. As briefly described above, only the routing information about the sensor node is preferably registered or updated, instead of whole information about the sensor node.

The I-GW 23 transmits the service request received from the user 10 to the sensor node registered to the backbone network 10 (more exactly, the SLR 22) based on the routing information and receives a response message to the service request from the registered sensor node. That is, the I-GW 23 interfaces between the backbone network 20 and the sensor network 30. Accordingly, if the sensor network 30 conforms to the general USN standard, the I-GW 23 may have a PAN coordinator function. With this configuration, sensor nodes may form an exclusive sensor network in conjunction with the I-GW 23 irrespective of the backbone network 20.

Due to their functional similarity, the I-GW 23 may be implemented as a PAN coordinator conforming to the USN standard. However, besides the general PAN coordinator functionality, the I-GW 23 functions to transmit a request message received from the backbone network 20 to the sensor network 30 and to transmit a response to the request message to the backbone network 20 (more exactly, the ATH 24). The I-GW 23 may have a plurality of communication channels to support various types of sensor networks 30.

The I-GW 23 may support initial subscription to the sensor node via a bn interface. Upon receipt of an initial subscription request for the sensor node, the I-GW 23 transmits the subscription request to the SLR 22. If the initial subscription is successfully completed through the SLR 22, the sensor node may acquire the IDs of the backbone network 20 and the I-GW 23 and the backbone network ID allocated to the sensor node by the backbone network 20.

The I-GW 23 may also support registration of the sensor node that has been initially subscribed to. Upon receipt of a registration request from the sensor node, the I-GW 23 transmits the registration request to the SLR 22. To support the registration of the sensor node, the I-GW 23 preferably broadcasts identification information about the backbone network 20 and the I-GW 23 periodically. Once the initial subscription to the sensor node is completed, the sensor node may sense movement by the broadcast signal and may transmit a registration request, when needed.

As described above, a plurality of I-GWs 23 may be connected to the backbone network 20 and an exclusive sensor network including one or more sensor nodes may be built through each I-GW 23. With this configuration, broad mobility of sensor nodes can be ensured in embodiments of the preset invention.

The ATH 24 transmits the service request received from the SCI 21 to the I-GW 23 through the session generated by the SCI 21 and provides a response message received from the I-GW 23 to the user 10. The received response message may include sensing information collected by the sensor node and additional result information. After the ATH 24 collects and stores the information when needed, the ATH 24 may provide the information to the user 10.

For this purpose, the ATH 24 transmits a service request received from the SCI 21 to the I-GW 23 via a tg interface and provides sensing information received from the I-GW 23 to the user 10 through the already generated and maintained session and a bu interface.

Upon termination of the session for the requested service, the ATH 24 notifies the I-GW 23 of the session termination so that the I-GW 23 may discontinue data sensing and reception. Thus, unnecessary power and resource consumption are prevented. The ATH 24 also notifies the AAA 25 of the session termination so that the AAA 25 performs accounting of charges for service use according to a preset billing policy.

Then, the SCI 21 notifies the user 10 of the service charges. Service charge accounting will be described below in greater detail.

The AAA 25 stores registration information and authorization information about the user 10. Upon receipt of the service request from the user 10, the AAA 25 transmits an authentication result for the user 10 to the SCI 21. The authorization information may specify whether the user 10 is authorized to access the sensor node and a billing policy regarding service use. Therefore, if the service requested by the user 10 is completed and thus the related session is terminated, the ATH 24 notifies the AAA 25 of the session termination so that the AAA 25 may perform accounting of charges for service use according to the billing policy included in the stored authorization information, as described above.

In summary, the AAA 25 functions to store and manage registration information, authentication information, sensor node access or non-access information about users, and billing policy information related to service use. Accordingly, the AAA utilizes authentication information about users to register, manage, and deregister user information and uses a billing table as the base of service charge accounting upon service termination.

The MD 27 pre-stores information about sensor nodes that can access the backbone network 20. This information is preferably preset and stored by a sensor node provider. Hence, an infra-system provider pre-records information about sensor nodes allowed to access the infrastructure backbone network 20 in the MD 27 by an agreement with the sensor node provider.

If the sensor node accesses the backbone network 20, for subscription or registration, the SLR 22 asks the MD 27 whether the sensor node is authorized to access the backbone network 20. The MD 27 checks whether the sensor node is authorized to access the backbone network 20 by a pre-stored list of authorized sensor nodes and replies to the SLR 22 with the check result. Thus, the SLR 22 may determine whether the sensor node is authorized to access the backbone network 20.

The LNI 26 maps aliases of objects whose service is requested by the user 10 to information about at least one I-GW corresponding to the aliases and stores the mapped aliases. The LNI 26 stores and manages aliases assigned to specific regions (e.g. 'Korea University') or objects (e.g. 'bus line 7000' or 'Yes Call Taxi'). The LNI 26 may store coordinates of the aliases. In this case, an alias may be assigned to one or more objects and if a specific region is named by an alias, the alias may have a group of a plurality of coordinates.

As briefly mentioned above, if the service request contains an alias, the SCI 21 queries the LNI 26 about the alias via an si interface. The LNI 26 may search its mapping table for I-GW information corresponding to the alias and return the detected I-GW information to the SCI 21. The I-GW information may be a list of one or more I-GW addresses.

The above description has been given, focusing on the roles and functions of the components of the infrastructure backbone network 20. To build and maintain the backbone network 20, an additional device may be used to manage the backbone network 20. This additional device is an I-CM 28.

The I-CM 28 manages network settings to maintain connectivity between components of the backbone network 20. More specifically, the I-CM 28 manages the components and network addresses for internal settings and maintains connection between the components via interfaces. Further, the I-CM 28 should enable self-recovery and self-configuration from abnormal states and configurations by sensing abnormal symptoms or defects in the components of the backbone network 20 and in the backbone network 20. For example, if network addresses are re-allocated to components due to a network failure, the addresses may be re-allocated according to an appropriate protocol or rule. If it is determined that it is difficult to normally request and provide a service due to a failure or abnormal symptom, a corresponding address area needs to be isolated.

The infrastructure for a sensor network and the individual components of the backbone network control apparatus have been described above in accordance with embodiments of the present invention. Various embodiments of the present invention for ensuring broad mobility of the sensor network using the backbone network control apparatus will be described hereinafter.

Figure 3:
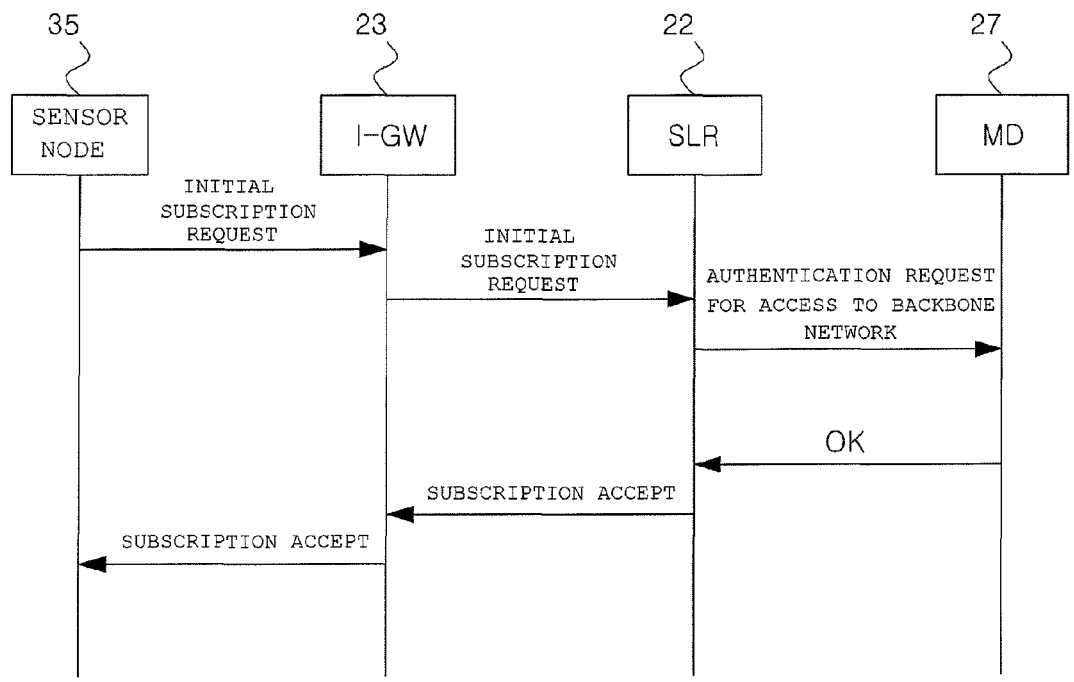
FIG. 3 illustrates an exemplary operation for initially subscribing to a sensor node in the infrastructure for controlling a backbone network illustrated in FIG. 2.

FIG. 3 illustrates an exemplary operation for initially subscribing to a sensor node in the infrastructure for controlling a backbone network illustrated in FIG. 2.

First of all, a sensor node 35 transmits an initial subscription request to the I-GW 23. The I-GW 23 forwards the initial subscription request to the SLR 22. The SLR 22 queries the MD 27 whether the sensor node 35 is authorized to access the backbone network. Upon receipt of an accept response message from the MD 27 in response to the query, the SLR 22 transmits the accept result to the sensor node 35 through the I-GW 23.

This operation will be described in more detail with reference to FIGS. 3a to 3d.

Figure 3A:
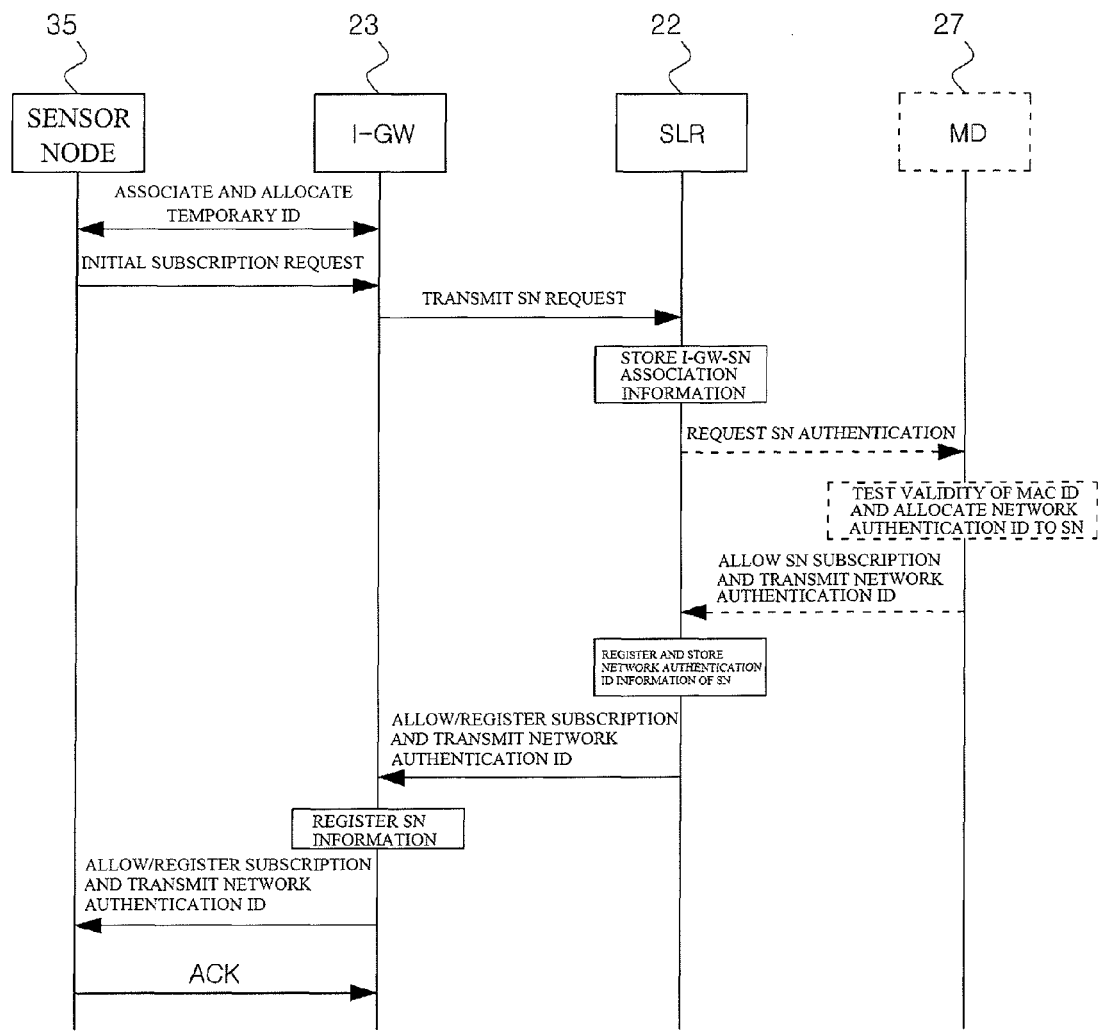
FIG. 3a illustrates an exemplary initial subscription and registration procedure for a sensor node according to an embodiment of the present invention.

FIG. 3a illustrates an exemplary initial subscription and registration procedure for a sensor node according to an embodiment of the present invention.

The procedure for performing initial subscription to a sensor node according to the embodiment of the present invention may be performed through the sensor node 35, the I-GW 23, the SLR 22, and the MD 27.

To communicate with the backbone network, the sensor node 35 may associate with the I-GW 23 and may be allocated a sensor node ID from the I-GW 23. This procedure will be referred to as an association procedure in the present invention.

When the sensor node is powered on or when the sensor node moves to and joins a new sensor network, the sensor node associates with an I-GW. The I-GW 23 transmits a wireless probe signal periodically around the I-GW 23 in order to announce its existence. The wireless probe signal may be a beacon message. The beacon message includes a signal announcing the existence of the I-GW, when the sensor node associates with the backbone network, for initial subscription, registration, and roaming, as well as a beacon defined in the standard. To join the sensor network, the sensor node may receive the beacon message from the I-GW and may transmit an association request message including the unique ID of the sensor node to associate with the I-GW. The unique ID of the sensor node may be a Media Access Control (MAC) ID. Upon receipt of the association request message from the sensor node, the I-GW may allocate a PAN ID and a sensor node ID to the sensor node and transmits an association accept message including the PAN ID and the sensor node ID to the sensor node. As the sensor node receives the association accept message and transmits an ACKnowledgement (ACK) message to the I-GW, the sensor node is associated with the I-GW.

A description will be given of association under two environments according to embodiments of the present invention. An embodiment of the present invention is about association in a sensor network environment of 'star topology'. Star topology refers to an environment in which a plurality of devices form a 1-hop network, centering around one coordinator. Sensor nodes are operated in a channel scanning mode to access the network. Upon receipt of a beacon message from the coordinator, a sensor node scans. If scanning is successful, the sensor node may transmit an association request message including a unique ID of the sensor node to an I-GW. Upon receipt of the association request message, the coordinator may generate a sensor node ID and may transmit an association accept message including the sensor node ID to the sensor node. Upon receipt of the association accept message, the sensor node stores the sensor node ID in a storage medium and transmits an ACK to the I-GW, completing the association procedure. The coordinator may be the I-GW or a sink node having an interface with the I-GW. To avoid the same sensor node IDs, the coordinator may determine the absence or presence of an already-allocated sensor node ID, referring to a mapping table that maps the unique IDs of sensor nodes to sensor node IDs. In the absence of an already-allocated sensor node ID, the coordinator generates a new sensor node ID, stores the new sensor node ID in the mapping table, and transmits the sensor node ID to the sensor node, thereby avoiding redundant allocations of a sensor node ID. When the sensor node moves to another sensor network and receives a beacon message from a new coordinator, an interruption may occur. If a coordinator address included in the received beacon message is different from the address of the old coordinator, the sensor node may set and store eventFlag, considering that it has connected to another network. Then, the sensor node may associate with the new sensor network.

Another embodiment of association is association in a sensor network environment of 'simple tree' or 'cluster tree'. Simple tree or cluster tree refers to an environment in which routing is supported and a multi-hop (one or more hops) ad-hoc network is configured. If a network is configured centering around a coordinator, a standard beacon message is not transmitted to a sensor node 2 or 3 hops away. In the present invention, the coordinator may transmit a routing message periodically around the coordinator. The routing message is included in a beacon message in a broad sense of the term. When an already associated 1-hop sensor node receives the routing message, the sensor node may add 1 to Hop in the routing message, store its sensor node ID, and forward the routing message to a 2-hop sensor node. If the sensor node ID is stored and then a sensor node ID set in a received message is identical to the stored sensor node ID, the sensor node may delete the received message, thereby suppressing a broadcast storm phenomenon. Upon receipt of the forwarded routing message, the 2-hop sensor node may determine whether the coordinator address of the routing message is identical to its coordinator address, the sensor network is better in signal quality than the old network, and the number of hops of the sensor node is smaller than a maximum number of hops. If the conditions are satisfied, the sensor node may determine that it has moved to another network. If determining that the sensor node has moved, the sensor node may transmit an association request message including the unique ID of the sensor node to the coordinator via the 1-hop sensor node to which the routing message has been forwarded (i.e. via a routing path). The coordinator may allocate a sensor node ID and transmits an association accept message including the sensor node ID to the 2-hop sensor node through the routing path. Upon receipt of the association accept message, the 2-hop sensor node may store the sensor node ID and transmit an ACK to the coordinator through the routing path. Then, upon receipt of the ACK, the coordinator may add the sensor node to a node list, completing the association procedure.

Only a sensor node having a backbone network ID can communicate with a backbone network in a sensor network according to an embodiment of the present invention. If the sensor node 35 does not have a backbone network ID, the sensor node 35 may request initial subscription to the backbone network through the I-GW 23 in order to be allocated a backbone network ID. The backbone network may determine whether to allow the subscription of the sensor node 35 by using the unique ID of the sensor node 35. The unique ID of the sensor node 35 may be a MAC ID. The sensor node 35 may transmit an initial subscription request including the MAC ID to the I-GW 23. The I-GW 23 may transmit the received initial subscription request to the SLR 22.

The SLR 22 may be a home location register. The SLR 22 may store association information between the sensor node 35 and the I-GW 23 that has received the initial subscription request and may query the pre-built MD 27 about the MAC ID of the sensor node 35 in order to determine whether the sensor node 35 is authorized to access the backbone network. The MD 27 may be incorporated in the SLR 22 or may be configured separately from the SLR 22. If the MD 27 is separately configured, the SLR 22 may transmit the initial subscription request including the MAC ID of the sensor node 35 to the MD 27. The MD 27 may test the validity of the MAC ID of the sensor node 35 by comparing it with MAC IDs pre-registered to the MD 27 by the sensor node providers. If the sensor node 35 passes the verification test, the MD 27 may allocate a backbone network ID to the sensor node 35 and may transmit a subscription accept message including the backbone network ID to the SLR 22. The SLR 22 maps the received backbone network ID to the pre-stored association information between the I-GW 23 and the sensor node 35. The SLR 22 may transmit the subscription accept message including the backbone network ID to the I-GW 23.

Upon receipt of the subscription accept message, the I-GW 23 may store the sensor network information, the sensor node ID and the backbone network ID of the sensor node and may transmit the subscription accept message including the backbone network ID to the sensor node. Upon receipt of the subscription accept message, the sensor node 35 may transmit an ACK to the I-GW 23 in response to the subscription accept message. The sensor node 35, which has been allocated the backbone network ID in the above procedure, can communicate with the backbone network.

With reference to FIG. 3a, the initial subscription procedure for a sensor node in a sensor network has been described above. A detailed description will now be given of the operation of each of the sensor node, the I-GW, and the SLR in the initial subscription and registration procedure with reference to FIGS. 3a to 3d.

Figure 3B:
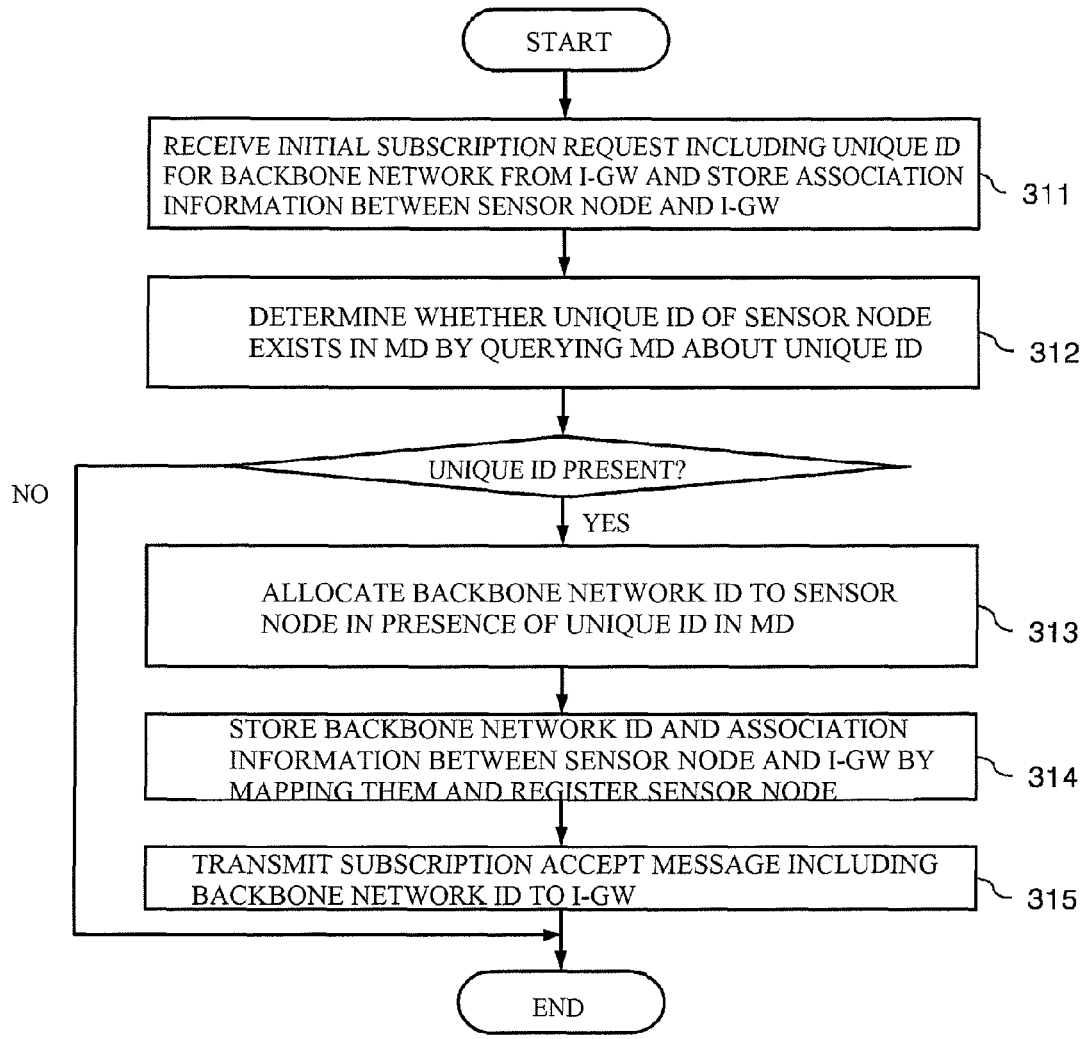
FIG. 3b is a detailed flowchart illustrating the initial subscription and registration procedure of FIG. 3a from the perspective of a sensor node register.

FIG. 3b is a detailed flowchart illustrating the initial subscription and registration procedure of FIG. 3a from the perspective of the SLR.

In step 311, the SLR receives an initial subscription request from the I-GW and stores association information between the sensor node and the I-GW.

Specifically, the SLR is a server that registers information about sensor nodes communicating with the backbone network. The SLR registers the sensor node by storing information about the sensor node. To register the sensor node to the SLR, it should be verified by a verification test that the sensor node is authorized to access the backbone network.

The SLR receives an initial subscription request for the background network, including the unique ID of the sensor node that does not have a background network ID, from the I-GW. The unique ID of the sensor node is required to test the validity of the sensor node. Before the verification test, the SLR stores association information between the sensor node and the I-GW.

In step 312, it is determined whether the MD has the unique ID of the sensor node.

More specifically, the MD stores information about the unique ID of each pre-registered sensor node so that sensor node providers can access the backbone network. The MD may be configured separately from the SLR or incorporated into the SLR in the backbone network. The SLR determines the presence of the unique ID of the sensor node in the MD by searching the pre-built MD for the unique ID of the sensor node.

In step 313, a backbone network ID is allocated to the sensor node according to a result of the test of step 312.

More specifically, in the presence of the unique ID of the sensor node in the MD in step 312, the backbone network ID is allocated to the sensor node. When the unique ID of the sensor node exists in the MD, the backbone network allows the sensor node to access the backbone network. On the contrary, in the absence of the unique ID of the sensor node in the MD, the backbone network may prohibit the sensor node from accessing the backbone network. Only if the MD has the unique ID of the sensor node in the backbone network, the sensor node is allowed to access the backbone network. Therefore, a malicious access from an authorized sensor node can be prevented and the quality of a sensor network service can be increased in the backbone network. In addition, sensor nodes can be managed efficiently in the above procedure. Furthermore, since a sensor node provider should register the unique ID of a sensor node to the MD in advance in order to use the backbone network, the backbone network may have knowledge of information about the sensor node provider. The sensor node provider can be effectively charged for the use of the backbone network, based on information about the sensor node provider and the sensor node.

In step 314, the allocated backbone network ID is mapped to association information between the sensor node and the I-GW, and the mapped association information is stored. Thus, the sensor node is registered.

Specifically, the backbone network ID allocated in step 313 is mapped to the association information between the sensor node and the I-GW, which has been stored in step 311, and the mapped association information is stored, thereby registering the sensor node to the SLR. The SLR registers the sensor node to a server by storing the information about the authenticated sensor node through the association information between the sensor node and the I-GW. As a network registration sensor stores the backbone network ID allocated to the sensor node by mapping it, the registered sensor node can communicate with the backbone network without a new initial subscription procedure. When the sensor node needs re-registration or roaming, the SLR may register the sensor node and may provide a roaming service to the sensor node using the registered information about the sensor node.

In step 315, the SLR transmits a subscription accept message including the backbone network ID to the I-GW.

Specifically, upon completion of the initial subscription procedure at the SLR, if the sensor node is authenticated, the SLR transmits a subscription accept message including the allocated backbone network ID to the sensor node. For transmission of the subscription accept message to the sensor node, the SLR transmits the subscription accept message to the I-GW communicating with the sensor node. Thus, the initial subscription procedure of the SLR is completed.

The SLR may include a communication means for communication, a registration means for storing and registering the unique ID of a sensor node, etc. The communication means may be configured as a wireless communication means, a wired communication means or a communication interface. The registration means may be any type of various storage media including a RAM, a ROM or a hard disk inside or outside the SLR. The MD may be incorporated into the SLR or may be configured separately from the SLR. A processing means for testing the validity of a sensor node may be included in the SLR. The processing means may be configured with a processor and a memory.

Figure 3C:
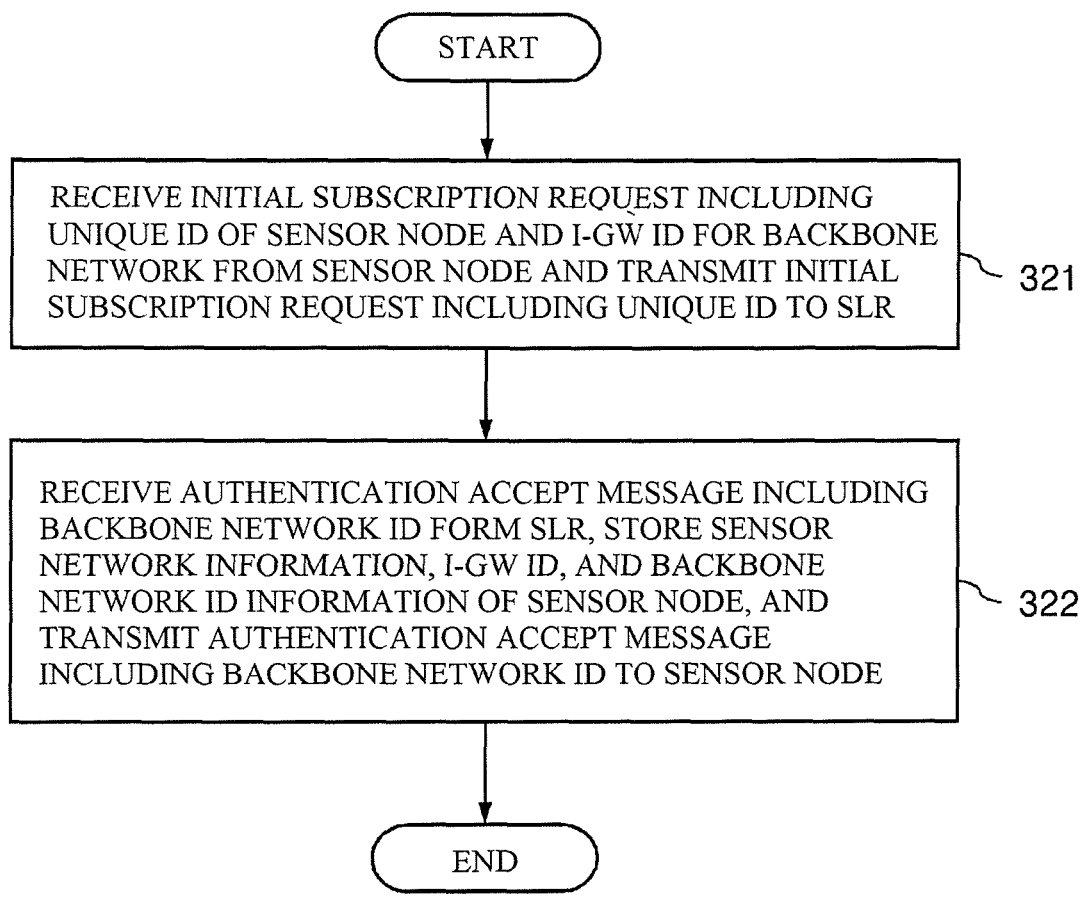
FIG. 3c is a detailed flowchart illustrating the initial subscription and registration procedure of FIG. 3a from the perspective of a gateway.

FIG. 3c is a detailed flowchart illustrating the initial subscription and registration procedure of FIG. 3a from the perspective of the I-GW.

In step 321, the I-GW receives an initial subscription request for the backbone network from the sensor node and transmits the initial subscription request to the SLR.

Specifically, the I-GW is a device acting as a gateway leading from one network to another network. As in a local area network, the I-GW is used to connect one network to another network. Each network may use a different communication protocol and direct communication is difficult between networks using different communication protocols. The I-GW serves as a coordinator that enables communication between such networks using different communication protocols. The I-GW reconfigures and modifies received data so that another I-GW to communicate with the I-GW may use the data.

The I-GW receives from the sensor node an initial subscription request including the unique ID of the sensor node and a sensor node ID, for the backbone network. The unique ID of the sensor node is used for authentication in the MD and the sensor node ID is used for communication between the sensor node and the I-GW. The I-GW transmits the initial subscription request for the backbone network, including the unique ID of the sensor node to the SLR. The I-GW may serve as a coordinator for the initial subscription procedure between the sensor node and the SLR.

In step 322, the I-GW receives a subscription accept message from the SLR, stores information about the sensor node, the sensor node ID, and the backbone network ID, and transmits the subscription accept message to the sensor node.

Specifically, the I-GW receives a subscription accept message including the backbone network ID from the SLR. The backbone network ID is allocated to the sensor node that the pre-built MD has authenticated using the unique ID of the sensor node. The MD transmits the subscription accept message including the allocated backbone network ID to the I-GW. The I-GW stores sensor network information, the sensor node ID, and the backbone network ID of the sensor node. Thus, the I-GW may identify the sensor node and coordinate communication between the sensor node and the backbone network, based on the stored information. The I-GW also transmits the subscription accept message including the backbone network ID to the sensor node. Upon receipt of an ACK indicating successful reception of the subscription accept message from the sensor node, the I-GW may communicate with the sensor node.

The I-GW may include a communication means for communication, a storage means for storing sensor node information, etc. The communication means may be configured as a wireless communication means, a wired communication means, or a communication interface. The storage means may be any type of various storage media including a RAM, a ROM or a hard disk inside or outside the I-GW.

Figure 3D:
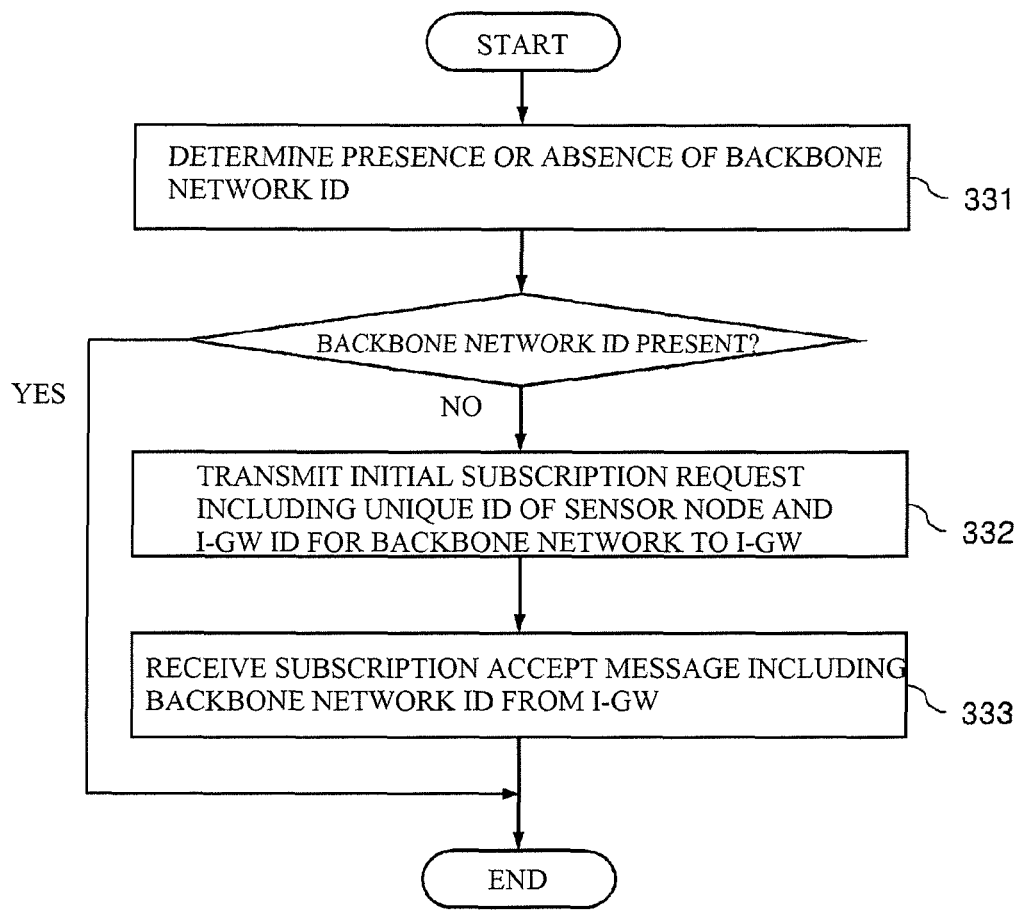
FIG. 3d is a detailed flowchart illustrating the initial subscription and registration procedure of FIG. 3a from the perspective of a sensor node.

FIG. 3d is a detailed flowchart illustrating the initial subscription and registration procedure of FIG. 3a from the perspective of the sensor node.

In step 331, the sensor node determines the presence or absence of a backbone network ID.

Specifically, the backbone network ID is an ID allocated to the sensor node after the sensor node passes a verification test of the MD. The MD tests whether the sensor node is valid for the backbone network to communicate with the sensor node and allocates the backbone network ID to the sensor node, if the sensor node is valid. Since access of an unauthorized sensor node to the backbone network is blocked, the quality of the sensor network can be increased. The sensor node may have a storage medium inside or outside it. The sensor node may store the backbone network ID in the storage medium. The backbone network ID may be designed not to allow manipulation in order to increase the efficiency. The backbone network ID may be generated by encryption or using the unique ID of the sensor node.

The sensor node may store the backbone network ID in the storage medium and may determine whether it has the ID of a backbone network to communicate with it. In the presence of the backbone network ID, the sensor node may perform a registration procedure with the SLR of the backbone network. If the sensor node has already registered to the SLR and is communicating with the backbone network, the registration procedure may not be performed.

In step 332, the sensor node transmits an initial subscription request for the backbone network including the unique ID and sensor node ID of the sensor node to the I-GW.

Specifically, in the absence of the backbone network ID, the sensor node should be allocated the backbone network ID in order to communicate with the backbone network. For allocation of the backbone network ID, the sensor node transmits an initial subscription request including the unique ID and sensor node ID of the sensor node for the backbone network to the I-GW with which the sensor node has associated. The sensor node has a unique ID assigned by a sensor node provider in a manufacturing process. The unique ID of the sensor node is specific to the sensor node and the backbone network may test using the unique ID of the sensor node whether the sensor node is valid for the backbone network. The unique ID of the sensor node may be a MAC ID. Any other ID such as a serial number may be used to identify the sensor node. The sensor node ID is used for communication between the sensor node and the I-GW. If the sensor node does not have the backbone network ID, the sensor node transmits an initial subscription request including the unique ID and the sensor node ID to the I-GW. The I-GW serves as a coordinator for communication between the sensor node and the backbone network. A sink node may substitute for the I-GW.

In step 333, the sensor node receives a subscription accept message including the backbone network ID from the I-GW.

Specifically, the MD performs a verification test on the sensor node that does not have the backbone network ID. If the MD determines that the sensor node is valid, the MD transmits a subscription accept message including a backbone network ID allocated to the sensor node. The sensor node receives the subscription accept message from the I-GW. In step 332, the MD assigns the backbone network ID to the sensor node after the MD authenticates the sensor node using the unique ID of the sensor node transmitted to the I-GW by the sensor node. As the sensor node receives the subscription accept message including the backbone network ID from the I-GW, it completes the initial subscription procedure with the backbone network. After the sensor node receives the subscription accept message, it may transmit an ACK to the I-GW. After completion of the initial subscription procedure, the sensor node may communicate with the backbone network through the I-GW.

The sensor node may include a communication means for transmitting an initial subscription request and conducting communication, a storage means, etc. The communication means may be configured as a wireless communication means, and a communication protocol used for ad-hoc communication between sensor nodes or for connection to a general-purpose network may be used. The storage means may be any type of various storage media including a RAM, a ROM or a hard disk inside or outside the sensor node.

In the above infrastructure adopted in the embodiments of the present invention, the sensor node may perform a preliminary procedure for initial subscription for the backbone network by a series of operations.

Figure 4:
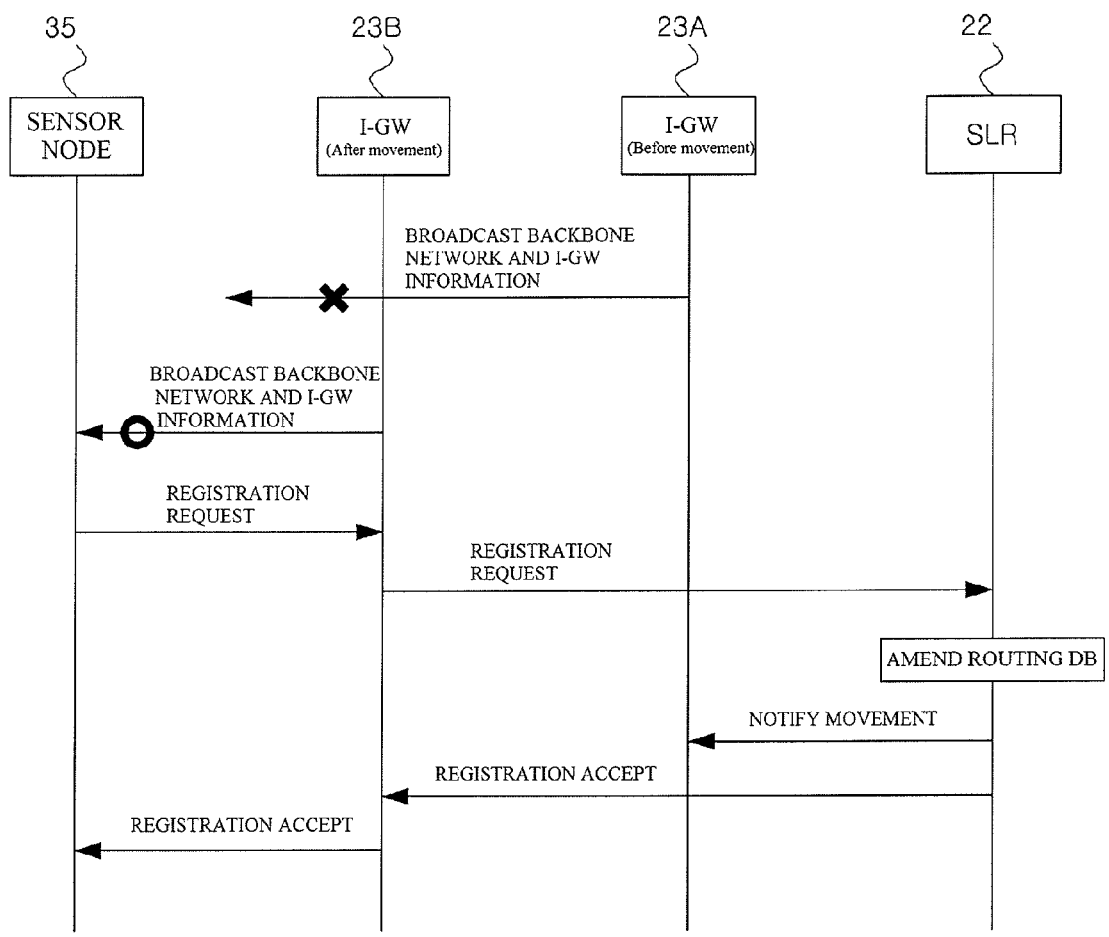
FIG. 4 illustrates an exemplary operation for registering a sensor node in the infrastructure for controlling the backbone network illustrated in FIG. 2.

FIG. 4 illustrates an exemplary operation for registering a sensor node in the infrastructure for controlling a backbone network illustrated in FIG. 2. An old I-GW before movement and a new I-GW after movement are denoted by reference numerals 23A and 23B, respectively.

The old I-GW 23A and the new I-GW 23B broadcast their backbone network information and I-GW ID information. It is assumed that the sensor node 35 moves out of a sensor network connected to the old I-GW 23A to a sensor network connected to the new I-GW 23B. In this case, even though both the I-GWs 23A and 23B broadcast their information, only the broadcast information may reach the sensor node 35 from the new I-GW 23B. That is, the sensor node 35 receives only the backbone network ID information and I-GW ID information about the new I-GW 23B.

Now, the sensor node 35 may recognize the new I-GW 23B and may perform registration based on the received information. The sensor node 35 transmits a registration request to the new I-GW 23B and the new I-GW 23B transmits the received registration request to the SLR 22. Then, the SLR 22 records/updates a movement history by amending a routing database regarding the sensor node 35. As described above, since the sensor node 35 has completed initial subscription, recording only information about the new I-GW 23B is sufficient in the registration procedure.

After the above operations, the SLR 22 notifies the old I-GW 23A of a movement result and replies to the new I-GW 23B with a registration result. Finally, the sensor node 35 receives the registration result from the new I-GW 23B, completing the movement procedure of the sensor node 35.

In summary, when a sensor node moves from one sensor network to another sensor network, the SLR 22 records and tracks down broad movement of the sensor node by updating changed I-GW information along with the movement of the sensor node.

Figure 4A:
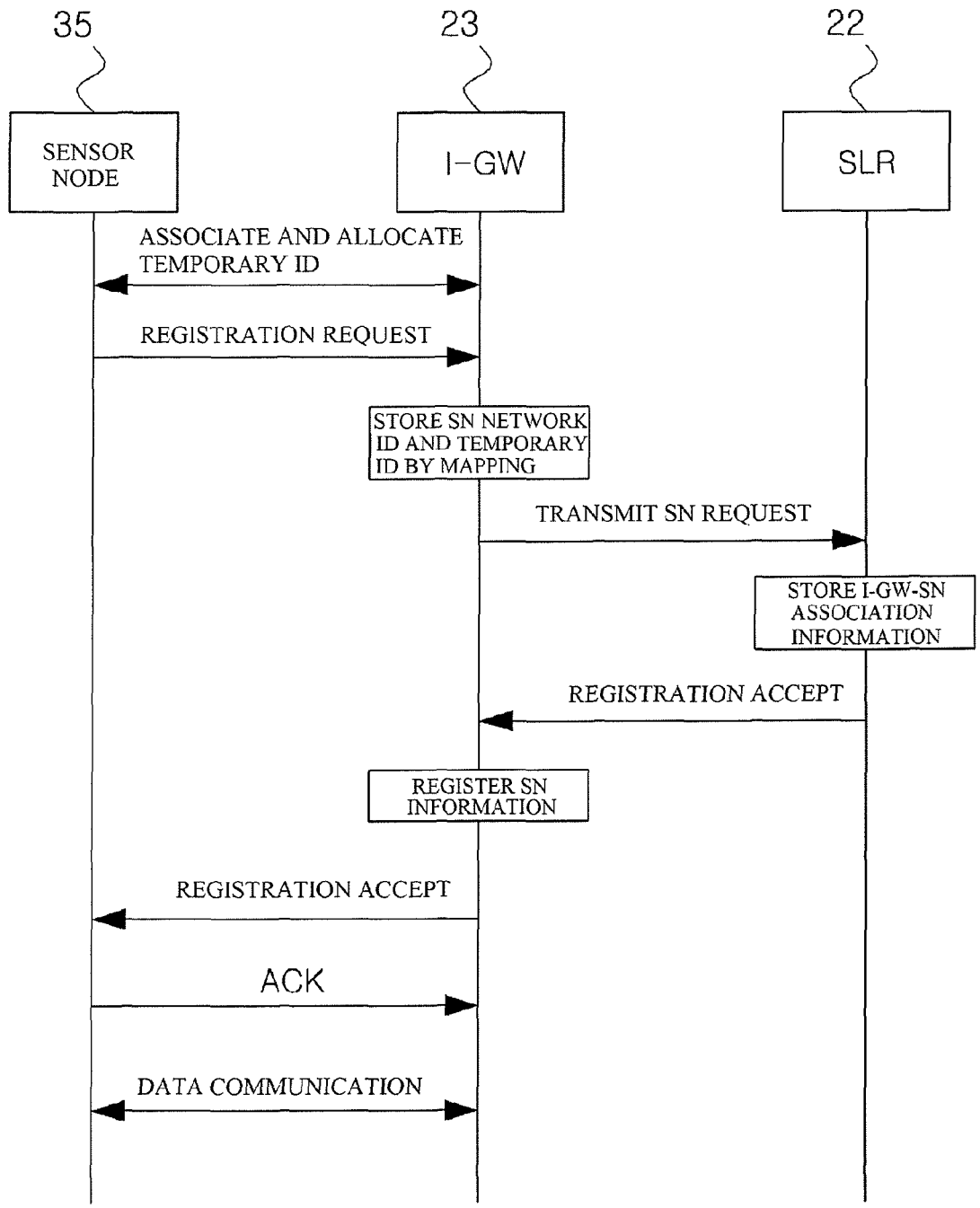
FIG. 4a illustrates an exemplary operation for registering a sensor node according to a further embodiment of the present invention.

FIG. 4a illustrates an operation for registering a sensor node according to an embodiment of the present invention.

The operation for registering a sensor node according to the embodiment of the present invention may be performed through the sensor node 35, the I-GW 23, and the SLR 22. The backbone network may support registration of sensor nodes in order to manage the networks or locations of authenticated sensor nodes. Upon power-on/off, upon receipt of a periodical beacon message from an I-GW, or upon movement to another sensor network, a sensor node may perform the registration procedure.

To communicate with the backbone network, the sensor node 35 may associate with the I-GW 23 and may be allocated a sensor node ID by communication. The association is performed as described above with reference to FIG. 3a and thus a description thereof is replaced by that of FIG. 3a. The sensor node 35 transmits a registration request including the backbone network ID and sensor node ID of the sensor node 35 to the associated I-GW 23. Upon receipt of the registration request, the I-GW may store mapping information between the backbone network ID and the sensor node ID of the sensor node 35 and may transmit a registration request to the SLR.

Upon receipt of the registration request, the SLR may store association information between the I-GW and the sensor node, thus registering the sensor node to the server. After registration of the sensor node, the SLR may transmit a registration accept message to the I-GW. Upon receipt of the registration accept message, the I-GW may store the sensor network information, sensor node ID, and backbone network ID of the sensor node and may transmit the registration accept message to the sensor node. Upon receipt of the registration accept message, the sensor node may transmit an ACK to the I-GW as a response. The sensor node, which has registered in the above procedure, is now capable of communicating with the backbone network.

Figure 5:
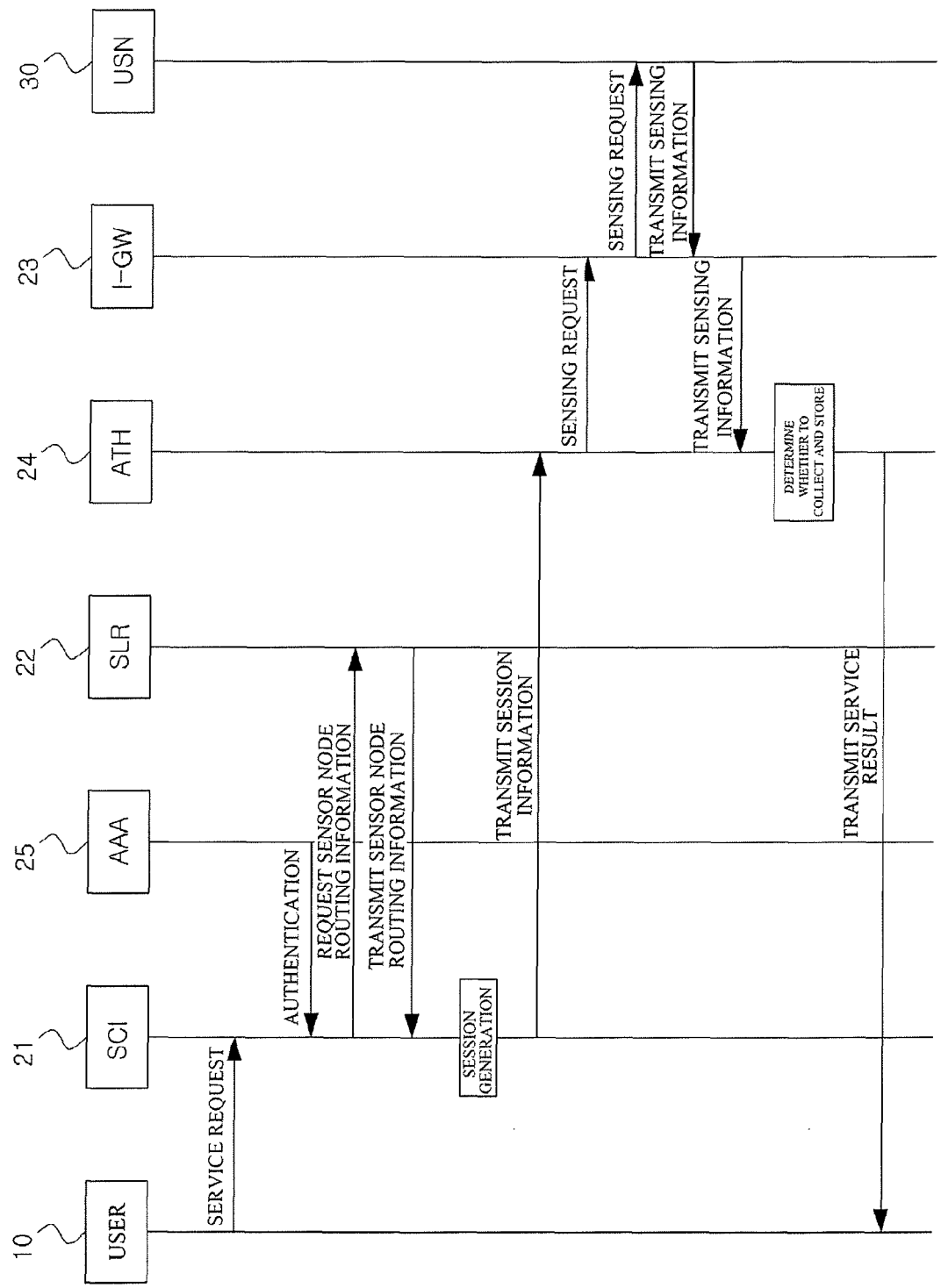
FIG. 5 illustrates an exemplary operation for transferring session information to a new gateway (I-GW) due to the movement of a sensor node that is being serviced in the infrastructure for controlling a backbone network illustrated in FIG. 2.

FIG. 5 illustrates an exemplary operation for transferring session information to a new I-GW along with movement of a sensor node being serviced in the infrastructure for controlling a backbone network illustrated in FIG. 2.

The old I-GW 23A requests transfer of session information to the SLR 22. Subsequently, the SLR 22 detects the address of the sensor node 35 by searching its routing database. If the routing database is not simply updated with the latest data but tracks down all changes of the sensor node 35 along with movement of the sensor node 35, the SLR 22 may secure the current address of the sensor node 35 by checking the latest destination in the routing table. Then, the SLR 22 transmits session information to the new I-GW 23B according to the search result.

In summary, as the sensor node 35 moves, the old I-GW 23A requests transfer of session information to the SLR 22 and the SLR 22 transmits the session information to the new I-GW 23B, thereby managing the transfer of the session information.

Figure 5A:
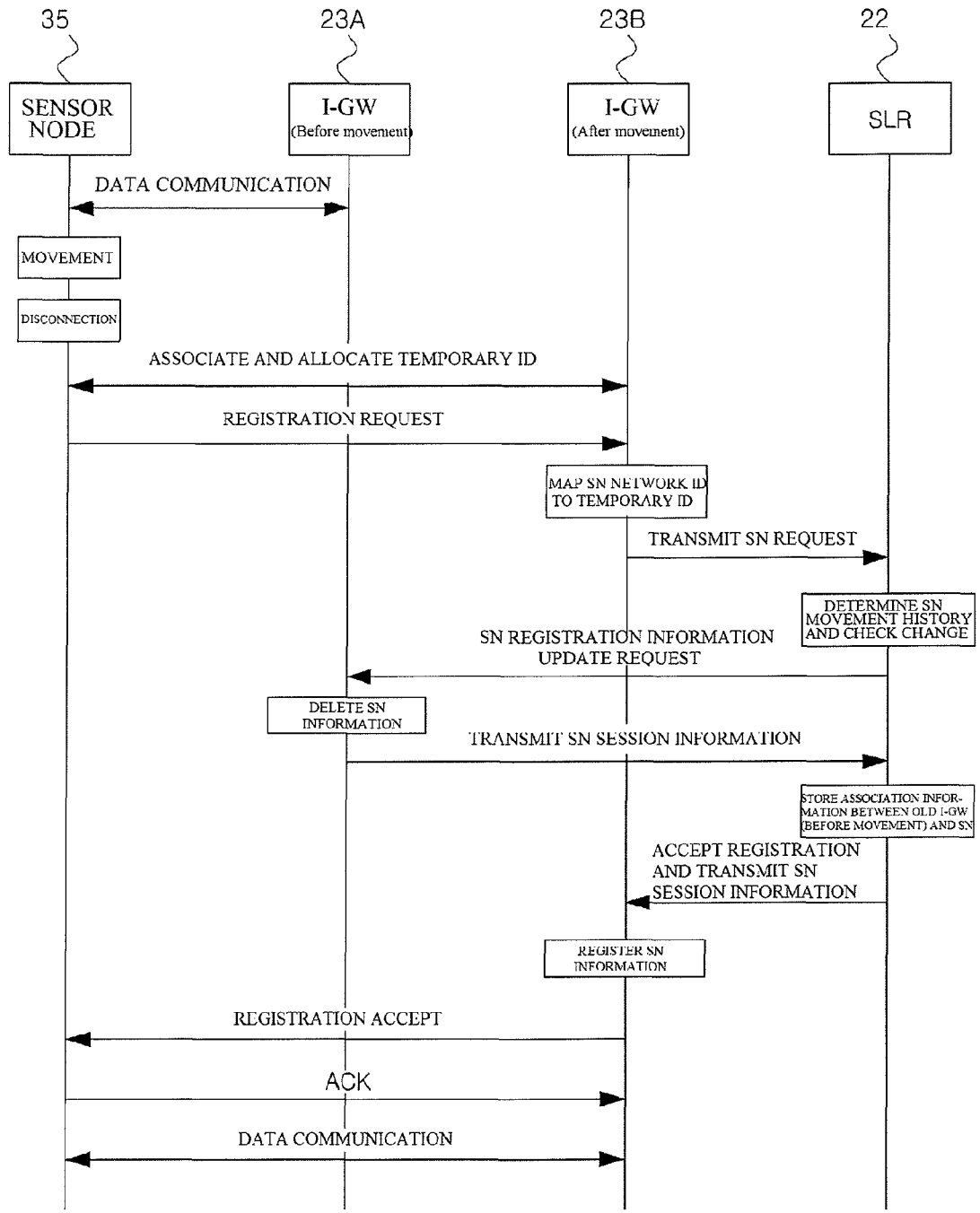
FIG. 5a illustrates an exemplary operation for registering a sensor node to a new gateway (I-GW) and transferring session information to the new gateway (I-GW) due to the movement of a sensor node that is being serviced in the infrastructure for controlling a backbone network illustrated in FIG. 2.

FIG. 5a illustrates an exemplary operation for registering a sensor node to a new I-GW and transferring session information to the new I-GW along with movement of the sensor node in the infrastructure for controlling a backbone network illustrated in FIG. 2.

A roaming procedure for a sensor node according to an embodiment of the present invention may be performed through the sensor node 35, the old I-GW 23A connected to the sensor node 35 before roaming, the new I-GW 23B connected to the sensor node 35 after roaming, and the SLR 22. The backbone network may support roaming so as to continue a session in consideration of the mobility of a sensor node and the service quality of a user. Although the sensor node 35 may be fixed, the sensor node 35 may move and thus the I-GW communicating with the backbone network may also be changed for the sensor node 35. If the sensor node moves during data communication with the backbone network through the I-GW, roaming is required for seamless communication.

If the sensor node moves, the I-GW changes from the old I-GW 23A to the new I-GW 23B and thus the sensor node is disconnected from the old I-GW 23A, communication information in relation to the old I-GW can be maintained only when session information is maintained and registered immediately to the new I-GW. When the sensor node is disconnected due to its movement, the sensor node may request registration to the new I-GW. The SLR receives a registration request in the same manner as in the registration procedure of FIG. 4a.

Upon receipt of the registration request, the SLR may detect association information between the sensor node and the old I-GW, thus determining movement of the sensor node.

As information about an I-GW is stored and registered for each sensor node, the SLR may determine whether a connected I-GW has been changed for a sensor node along with movement of the sensor node by comparing I-GW information. If determining that the I-GW has been changed, the SLR may receive session information from the old I-GW and transmit the session information to the new I-GW in order to maintain the session information about the sensor node. The SLR may transmit a registration information update request of the roaming sensor node to the old I-GW. The old I-GW may transmit the session information about the roaming sensor node to the SLR, delete information about the sensor node, and thus disconnect communication from the sensor node. The SLR may transmit a registration accept message including the session information about the sensor node received from the old I-GW to the new I-GW. The new I-GW may store the session information, the sensor node ID, and the backbone network ID and transmit the registration accept message to the sensor node. The sensor node may transmit an ACK to the I-GW in response to the registration accept message. The sensor node, which has registered in the above procedure, may continue data communication seamlessly and communicate with the backbone network.

Figure 6:
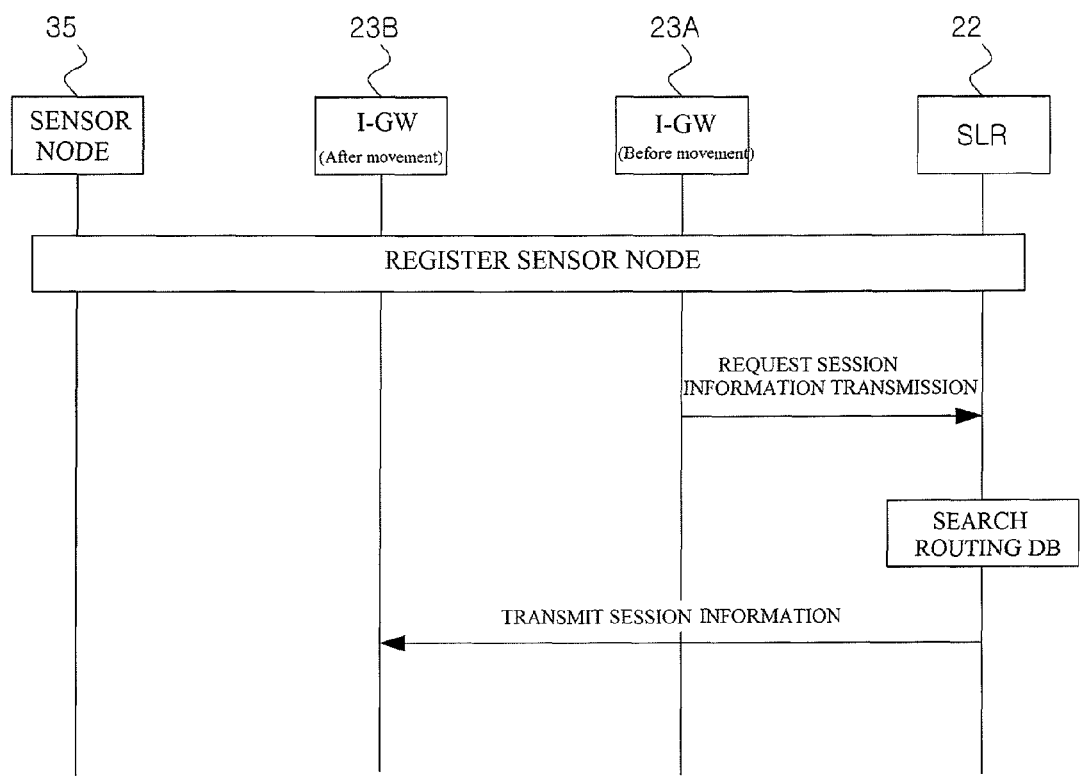
FIG. 6 illustrates an exemplary operation for processing a user service request in the infrastructure for controlling a backbone network illustrated in FIG. 2.

FIG. 6 illustrates an exemplary operation for processing a service request of a user in the infrastructure for controlling a backbone network illustrated in FIG. 2.

First, the user 10 inputs a service request to the SCI 21. The service request may be at least one of an on-demand request, a periodic request, and an event-driven request. If the AAA 25 authenticates the user 10, the SCI 21 requests routing information about a sensor node to the SLR 22 and receives a response from the SLR 22. Then, the SCI 21 creates a session.

The SCI 21 transmits information about the created session to the ATH 24 and the ATH 24 requests sensing of the sensor node through the I-GW 23 corresponding to the service request. If a sensing result is generated by an activity of the sensor network 30 in response to the sensing request from the I-GW 23, sensor nodes reply to the I-GW 23 with sensing information and the I-GW 23 transmits the received sensing information to the ATH 24. The ATH 24 appropriately processes the received sensing information by collecting or storing the sensing information and then transmits the processing result of the service request to the user 10.

In accordance with the forgoing embodiments of the present invention, since authentication and registration of a sensor node and tracking and updating of an association between the sensor node and an I-GW are performed through a backbone network for a sensor network, identification and registration between the sensor node and the I-GW can be managed in an integrated manner in the backbone network. Therefore, even though a plurality of sensor nodes belong to heterogeneous sensor networks or a sensor node moves across a wide area, each sensor node can be registered, located, and tracked. Consequently, the broad mobility of sensor nodes can be controlled/managed without limitations in the backbone network.

In embodiments of the present invention, sensor networks under non-systematic development can be absorbed into an open infrastructure. Thus, wide deployment of a network can be supported reliably and development of an access network based on an access standard is facilitated. On the other hand, a conventional LBS has limitations in terms of precision and coverage (e.g. a service is not provided in consideration of both an indoor location and an outdoor location. However, the use of the proposed infrastructure system enables the provision of a new service by combining indoor location information achieved through a sensor network with outdoor location information achieved through a GPS, etc. Furthermore, a service of monitoring the movement of a vehicle, locating products, and tracking a moving object can be provided actually by applying the embodiments of the present invention to logistics based on support of broad mobility and location information.

In the apparatus for controlling a backbone network for a sensor network according to the embodiment of the present invention, the SLR can register and manage node information about sensor nodes.

Specifically, the I-GW broadcasts a node information request to local sensor nodes of the I-GW in order to register node information about a sensor node. The sensor node receives the node information request and transmits node information including the ID of the sensor node and the ID of an initially belonged home GW to the I-GW, thereby requesting registration. The I-GW registers the node information about the sensor node to the SLR that registers and manages node information about the local sensor nodes of the I-GW.

The SLR may include a home location information server that registers and manages node information about sensor nodes to which the I-GW is a home GW and a visited location information server that registers and manages node information about sensor nodes visiting the I-GW.

If the sensor node belongs to the I-GW, that is, the I-GW is the home GW of the sensor node, the I-GW registers the node information to the home location information server. If the sensor node does not belong to the I-GW, that is, the I-GW is not the home GW of the sensor node, the I-GW registers the node information to the visited location information server.

An I-GW to which the sensor node is initially to belong may be predetermined and set in a Home Gateway ID (H-GW) field or the H-GW field may be set to 0. A Hop field indicates the hop count of the sensor node from the I-GW, for use in routing. Upon receipt of a node information request message from the I-GW, if the H-GW field of the sensor node is 0, the sensor node determines the I-GW to be its home GW, sets the H-GW field, and transmits a registration packet. The sensor node recognizes the initial I-GW as its home GW until before receiving a home GW change request from the I-GW. When the sensor node is reset, it also maintains the H-GW field. Besides, the sensor node registers a node ID, a node type (e.g. RFID node, sensor node, relay node, reference node, etc.), a sensing type (e.g. temperature, illuminance, humidity, pressure, etc.), a current location, the count of hops to a current I-GW, etc. An event field indicates a situation in which the registration request has been issued, for example, initialization, reset, movement, etc.

A reference node in a sensor network provides location information periodically to neighbor sensor nodes (RFID/Sensor nodes) (S600). To register node information through an I-GW in a new area to which the reference node has moved, the reference node should determine the count of hops to the I-GW for routing. Since the count of hops to an old I-GW changes due to movement of the reference node, the reference node should determine the count of hops from the neighbor nodes. Therefore, if the location field of a registration packet has been changed, the reference node asks the neighbor nodes about their hop counts and awaits reception of the hop counts. The neighbor nodes may include an I-GW (or a sink node). Upon receipt of hop count information from the plurality of neighbor nodes, the reference node selects a neighbor node that has responded with a smallest hop count, recognizes the selected neighbor node as a parent node (an upper node), and determines the hop count of the reference node to be the hop count of the parent node+1. Then, the reference node registers its information to the current I-GW through the parent node.

For this purpose, if each sensor node receives a hop information query from a neighbor node, the sensor node should indicate its hop count to the asking node. Upon receipt of a registration packet, the sensor node should forward the registration packet to its parent node. If a sensor node is reset or moves to its I-GW area to which it belongs, that is, to the area of a home GW, the sensor node registers its node information to the home location information server of the I-GW. If the I-GW is not the home GW, the sensor node registers its information to the visited location information server. The visited location information server may transmit the node information about the registered visiting sensor node to the home location information server of the home GW of the sensor node so that the home location information server can update the node information about the visiting sensor node.

If a neighbor node is yet to be initialized, routing is impossible and thus registration of the sensor node to the I-GW is also impossible. Therefore, the sensor node waits a node information request from the I-GW for a predetermined time (e.g. an initialization time of the neighbor node) and then attempts to request registration again.

Once the node information about the sensor node is registered to the home location information server, the home location information server generates a backbone network ID (or a Global ID) that an Internet Protocol (IP) network recognizes as the address of the sensor node, using a sensor node ID and a home GW ID included in the node information about the sensor node. In an embodiment of the present invention, the home location information server may generate an address translation table that maps the sensor node ID to the backbone network ID. The backbone network ID may include the port count and home GW ID of the sensor node.

In the present invention, IDs of a sensor node may be classified into a sensor node ID and a backbone network ID. The sensor node ID is, for example, an RFID/Sensor node ID used only within an RFID/USN network. A manufacturer of the RFID/Sensor node or a network manager assigns a 16/64-bit address as the sensor node ID. On the other hand, the backbone network ID is an ID of the RFID/Sensor node from the perspective of an RFID/USN infra-network or any other network. The backbone network ID is generated by converting the 16/64-bit sensor node ID (local address) and home GW ID of the RFID/Sensor node to the form of the IP address+port count of the home GW.

For example, an RFID/Sensor node (ID: 0x0003), for which an I-GW (ID: 0x0001) having an IP address of 163.152.27.112 is a home GW, is stored as 163.152.27.112/3 in the address translation table created by the home location information server. However, the RFID/Sensor node conducts communication, considering that the address of the I-GW is not the IP address 163/152.27.112 but ID (0x0001).

As a backbone network ID is generated and used in the above manner, the present invention can improve the efficiency of interaction and node information management in a network. If a sensor node moves, such an effect as Mobile IP can be achieved by combining the functions of a home location information server and a visited location information server. Further, since the backbone network ID is generated and used in the form of the IP address+port count of a home GW, a sensor node ID used for a sensor node belonging to one home GW can be used for a sensor node belonging to another home GW, thereby increasing the reuse rate of sensor node IDs. Obviously, different sensor node IDs should be allocated to sensor nodes within the same home GW. A sensor node to which a backbone network ID is allocated can be perceived as a terminal having an IP.

The I-GW may transmit a data request packet received from a user host of the IP network to the sensor node using the backbone network ID and may transmit a sensing data packet received from the sensor node to the user host. In this case, the home location information server performs address translation on the sensor node ID or backbone network ID of the data packet to the backbone network ID or the sensor node ID during data transmission between the sensor node and the IP network. The address translation may be performed using the address translation table.

Specifically, the home location information server manages the addresses and locations of nodes belonging to the corresponding I-GW.

Regarding address management, the RFID/USN infra-network and an external entity outside the RFID/USN infra-network perceive the address of a sensor node as ip+port as in TCP/IP. Therefore, a home location information server of an I-GW having the ip perceives a port number included in the global ID as an address within the RFID/Sensor network and requests a response to a sensor node corresponding to the address. For this purpose, the home location information server should perform an address translation function and thus may have an address translation table.

The home location information server may include an address translation table manager, an address translator, and a protocol processor.

The address translation table manager is a module that adds an address to, deletes an address from, maintains, repairs, and manages the address translation table. The address translation table manager translates a sensor node ID to a backbone network ID taking the form of a TCP/IP address using registration packet information received from the I-GW and stores the backbone network ID in the address translation table. That is, GW ID+sensor node ID may be translated into GW ip+port count.

The address translator performs address translation on a data request packet received from a user host or a sensing data packet received from a sensor node, referring to the address translation table. That is, the address translator performs address translation between the RFID/Sensor network and the RFID/USN infra-network using the address translation table updated by the address translation table manager. For example, upon receipt of a data packet, the address translator first determines whether the data packet is a sensor network packet or an Internet packet. In the case of a sensor network packet, the address translator translates a sensor node ID to a backbone network ID in the form of a TCP/IP address. In the case of a TCP/IP packet, the address translator translates a backbone network ID to a sensor node ID.

The protocol processor processes the data request packet or the sensing data packet according to a protocol of the sensor network or the IP network and forwards the processed packet to the sensor network or the IP network. The protocol processor may include an RFID/Sensor network protocol processor and an RFID/USN infra-network protocol processor.

Meanwhile, the visited location information server may be configured similarly to the home location information server in terms of structure and function.

If the visited location information server registers node information about a visiting sensor node, it transmits the node information to the home location information server of the home GW of the visiting sensor node so that the home location information server may update the node information about the sensor node. That is, if the visited location information server of each I-GW registers node information about a sensor node to which the I-GW is not its home GW, the visited location information server may determine the home GW of the sensor node and the IP of the home GW from the value of an H-GW field set in a corresponding node information registration packet. Then, the visited location information server notifies the home GW of the sensor node that the sensor node has moved.

The present invention further provides a computer-readable recording medium to which the method for controlling each component in the apparatus for controlling a backbone network for a sensor network is written so that the method may be read and executed by a computer. That is, the embodiments of the present invention may be implemented as code that can be written on a computer-readable recording medium and thus read by a computer. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments to realize the embodiments herein can be construed by one of ordinary skill in the art.

The present invention has been described with reference to the foregoing embodiments. It will be understood by those skilled in the art that the invention can be implemented in other specific forms without changing the essential features of the invention. Therefore, it should be noted that the disclosed embodiments are to be considered illustrative in all aspects and are not to be considered in a limiting sense. The scope of the invention is defined by the appended claims rather than the detailed description of the invention. All changes which come within the range of equivalency of the claims should be construed as falling within the scope of the invention.

INDUSTRIAL APPLICABILITY

In accordance with the embodiments of the present invention, since authentication and registration of a sensor node and tracking and updating of an association between the sensor node and an I-GW are performed through a backbone network for a sensor network, identification and registration between the sensor node and the I-GW can be managed in an integrated manner in the backbone network. Therefore, even in a situation where a plurality of sensor nodes belong to heterogeneous sensor networks and a sensor node moves across a wide area, each sensor node can be registered, located, and tracked. Consequently, the broad mobility of sensor nodes can be controlled/managed without limitations in the backbone network. In addition, the backbone network can be protected from the access of a sensor node that has not been authenticated in a sensor node authentication procedure.

The invention claimed is:

1. An apparatus for controlling a backbone network for a sensor network, the apparatus comprising:
    a context interpreter for interpreting a service request requesting a service to a sensor node, received from a user according to the type of the service request and generating a session comprising routing information about the interpreted service request;
    a sensor node register for storing sensor node information and routing information about sensor nodes registered to the backbone network and, upon receipt of the service request, providing routing information corresponding to the service request to the context interpreter;

a gateway for transmitting the service request to the sensor node registered to the backbone network and receiving a response message to the service request from the registered sensor node; and a message processor for transmitting the service request received from the context interpreter to the gateway through the generated session and providing the response message received from the gateway to the user; and a sensor node authenticator for pre-storing information about sensor nodes that are accessible to the backbone network, wherein if the sensor node accesses the backbone network for registration, the sensor node register determines whether to allow the sensor node to access the backbone network by asking the sensor node authenticator whether the sensor node is authorized to access the backbone network, wherein if the sensor node without a backbone network ID accesses the backbone network for registration, the sensor node register receives an authentication request for the backbone network, comprising a unique Identifier (ID) of the sensor node, through the gateway, stores association information between the sensor node and the gateway, determines whether the unique ID of the sensor node exists in the sensor node authenticator by asking the sensor node authenticator about the unique ID of the sensor node, allocating the backbone network ID to the sensor node in the presence of the unique ID of the sensor node in the sensor node authenticator, registers the sensor node by storing the backbone network ID mapped to the association information between the sensor node and the gateway, and transmits the backbone network ID to the sensor node through the gateway.

2. The apparatus according to claim 1, further comprising a user authenticator for storing registration information and authorization information about the user and, upon receipt of the service request from the user, transmitting an authentication result of the user to the context interpreter.

3. The apparatus according to claim 2, wherein the authorization information comprises information indicating whether the user is authorized to access the sensor node and a billing policy for service use, wherein upon termination of the session for the requested service, the message processor notifies the gateway of the termination of the session so that the gateway discontinues data transmission and notifies the user authenticator of the termination of the session so that the user authenticator determines a service charge for service use according to the billing policy, and wherein the context interpreter provides information about the determined service charge to the user.

4. The apparatus according to claim 1, further comprising an alias interpreter for mapping each of aliases indicating service-requested objects to information about one or more gateways corresponding to the alias and storing the mapped aliases and gateway information, wherein if the service request comprises an alias, the context interpreter receives gateway information corresponding to the alias from the alias interpreter by querying the alias interpreter about the alias.

5. The apparatus according to claim 1, wherein when the sensor node is initially subscribed to, the sensor node register stores information about a service type and a service capability of the sensor node, stores a backbone network ID allocated to the sensor node and information about the gateway connected to the sensor node by mapping the backbone network ID to the gateway information, and provides the routing information corresponding to the service request to the context interpreter.

6. The apparatus according to claim 1, further comprising a backbone network configurer for managing a network setting to maintain a connection between components included in the backbone network.

7. The apparatus according to claim 1, wherein the service request is at least one of an on-demand request, a periodic request, and an event-driven request.

8. The apparatus according to claim 1, wherein a plurality of gateways are connected to the backbone network and exclusive sensor networks, each comprising one or more sensor nodes, are configured through the gateways.

9. The apparatus according to claim 8, wherein if a sensor node moves from one sensor network to another sensor network, the sensor node register updates gateway information about the sensor node, which is changed due to movement of the sensor node.

10. The apparatus according to claim 9, wherein a new gateway connected to the sensor node due to movement of the sensor node requests transfer of session information to the sensor node register and the sensor node register transmits the session information to the new gateway in response to the request.

11. The apparatus according to claim 1, wherein the gateway broadcasts information about the backbone network and identification information about the gateway and receives a registration request from a sensor node receiving the broadcast information.

12. The apparatus according to claim 1, wherein the gateway is a Personal Area Network (PAN) coordinator conforming to a Ubiquitous Sensor Network (USN) standard.

13. A method for controlling a backbone network for a sensor network, the method comprising:

receiving an initial subscription request for the backbone network, comprising a unique Identifier (ID) of a sensor node without a backbone ID, from a gateway;

storing association information between the sensor node and the gateway;

determining whether the unique ID of the sensor node exists in a preset sensor node authenticator by querying the sensor node authenticator about the unique ID of the sensor node;

allocating the backbone network ID to the sensor node in the presence of the unique ID of the sensor node in the sensor node authenticator;

registering the sensor node by mapping the backbone network ID to the association information between the sensor node and the gateway and storing the mapped backbone network ID and association information;

transmitting a subscription accept message comprising the backbone network ID to the gateway;

receiving a registration request requesting registration to the backbone network from the sensor node having the backbone network ID through the gateway and registering the sensor node by storing the association information between the sensor node and the gateway; and transmitting a registration accept message to the gateway.

14. The method according to claim 13, further comprising:

receiving a backbone network registration request comprising the backbone network ID of the sensor node from a new gateway of the sensor node, if the sensor node moves and the gateway communicating with the sensor node is changed to the new gateway, checking the association information between the sensor node and the gateway connected to the sensor node before the movement, and transmitting a registration information update request of the sensor node to the gateway connected to the sensor node before the movement;

receiving session information about the sensor node from the gateway connected to the sensor node before the movement and registering the sensor node by storing association information between the sensor node and the new gateway; and transmitting a registration accept message and the session information about the sensor node to the new gateway.

15. A method for controlling a backbone network for a sensor network, the method comprising:

receiving an initial subscription request for the backbone network from a sensor node without a backbone network Identifier (ID), the initial subscription request comprising a unique ID and a sensor node ID of the sensor node, and transmitting an initial subscription request comprising the unique ID of the sensor node for the backbone network to a sensor node register;

receiving a subscription accept message comprising the backbone network ID from the sensor node register, storing sensor network information, the sensor node ID, and the backbone network ID of the sensor node, and transmitting a subscription accept message comprising the backbone network ID to the sensor node;

receiving a registration request for the backbone network from the sensor node having the backbone network ID, the registration request comprising the backbone network ID and the sensor node ID, storing the backbone network ID and the sensor node ID by mapping the backbone network ID to the sensor node ID, and transmitting the backbone network registration request to the sensor node register; and receiving a registration accept message from the sensor node register, storing the sensor network information, the sensor node ID, and the backbone network ID of the sensor node, and transmitting the registration accept message to the sensor node, wherein the backbone network ID is assigned to the sensor node, when a sensor node authenticator authenticates the sensor node using the unique ID of the sensor node.

16. The method according to claim 15, wherein if the sensor node moves and the gateway communicating with the sensor node is changed to a new gateway, the method further comprises:

receiving a backbone network registration request comprising the backbone network ID and the sensor node ID of the sensor node from the sensor node to which the backbone network ID is assigned, storing the backbone network ID and the sensor node ID by mapping the backbone network ID to the sensor node ID, and transmitting the backbone network registration request to the sensor node register by a gateway connected to the sensor node before the sensor node moves; and receiving a registration accept message and session information about the sensor node from the sensor node register, storing sensor network information, the sensor node ID, and the backbone network ID of the sensor node, and transmitting the registration accept message to the sensor node by the gateway connected to the sensor node before the sensor node moves.

17. The method according to claim 15, wherein if the sensor node moves and the gateway communicating with the sensor node is changed to a new gateway, the method further comprises:

receiving a request for updating information about the sensor node from the sensor node, transmitting session information about the sensor node to the sensor node register, and deleting the information about the sensor node by the new gateway.

18. A method for controlling a backbone network for a sensor network, the method comprising:

determining whether a sensor node has a backbone network Identifier (ID);

transmitting an initial subscription request for the backbone network, comprising a unique ID and a sensor node ID of the sensor node to a gateway, in the absence of the backbone network ID;

receiving a subscription accept message comprising the backbone network ID from the gateway;

receiving a wireless probe signal from the gateway, before the presence or absence of the backbone network ID is determined;

transmitting an association request message comprising the unique ID of the sensor node to the gateway; and receiving an association accept message comprising the sensor node ID from the gateway, wherein the backbone network ID is assigned to the sensor node when a sensor node authenticator authenticates the sensor node using the unique ID of the sensor node, wherein the sensor node ID is assigned to the sensor node so that the gateway distinguishes the sensor node from other sensor nodes.

19. The method according to claim 18, further comprising:

transmitting a registration request for the backbone network, comprising the backbone network ID and the sensor node ID, to the gateway; and receiving a registration accept message from the gateway.

20. The method according to claim 18, wherein if the sensor node moves and the gateway communicating with the sensor node is changed to a new gateway, the method further comprises:

transmitting a registration request for the backbone network, comprising the backbone network ID and the sensor node ID, to the new gateway; and receiving a registration accept message from the new gateway.

* * * * *